(12) United States Patent
Lamba et al.

(10) Patent No.: US 11,947,446 B2
(45) Date of Patent: Apr. 2, 2024

(54) SYSTEMS AND METHODS FOR CUSTOMER JOURNEY ORCHESTRATION

(71) Applicant: ADOBE INC., San Jose, CA (US)

(72) Inventors: Mukul Lamba, Himachal Pradesh (IN); Saurabh Garg, New Delhi (IN); Mandeep Singh, Bhiwadi (IN); Kaushal Mishra, Bangalore (IN)

(73) Assignee: ADOBE INC., San Jose, CA (US)

( * ) Notice: Subject to any disclaimer, the term of this patent is extended or adjusted under 35 U.S.C. 154(b) by 60 days.

(21) Appl. No.: 17/659,198

(22) Filed: Apr. 14, 2022

(65) Prior Publication Data

US 2023/0333966 A1    Oct. 19, 2023

(51) Int. Cl.
*G06F 11/36* (2006.01)
*G06F 9/54* (2006.01)
*G06Q 30/016* (2023.01)

(52) U.S. Cl.
CPC ............ *G06F 11/366* (2013.01); *G06F 9/542* (2013.01); *G06Q 30/016* (2013.01)

(58) Field of Classification Search
CPC ...... G06F 11/366; G06F 9/542; G06Q 30/016
USPC ........................................................ 714/38.1
See application file for complete search history.

(56) References Cited

U.S. PATENT DOCUMENTS

| | | | |
|---|---|---|---|
| 9,674,362 B2 | 6/2017 | Piaggio et al. | |
| 9,986,094 B2 | 5/2018 | Piaggio et al. | |
| 10,142,475 B2 | 11/2018 | Piaggio et al. | |
| 10,198,490 B2 | 2/2019 | No et al. | |
| 10,270,912 B2 | 4/2019 | Piaggio et al. | |
| 10,404,860 B2 | 9/2019 | Piaggio et al. | |
| 10,567,585 B2 | 2/2020 | Piaggio et al. | |
| 10,715,667 B2 | 7/2020 | Piaggio et al. | |
| 10,909,128 B2 | 2/2021 | Beringer et al. | |
| 11,019,210 B2 | 5/2021 | Piaggio et al. | |
| 11,151,125 B1 | 10/2021 | Dwivedi et al. | |
| 11,200,485 B2 | 12/2021 | Friio et al. | |
| 11,269,908 B2 | 3/2022 | Beringer et al. | |
| 11,451,668 B2 | 9/2022 | Piaggio et al. | |
| 11,550,849 B2 | 1/2023 | Beringer et al. | |

(Continued)

OTHER PUBLICATIONS

Google Firebase, available at https://firebase.google.com/.

(Continued)

*Primary Examiner* — Yair Leibovich
(74) *Attorney, Agent, or Firm* — F. CHAU & ASSOCIATES, LLC

(57) ABSTRACT

Systems and methods for customer journey orchestration are described. One or more aspects of the systems and methods include identifying, by a customer journey orchestration application, a customer journey having a previously unidentified fault; initiating, by a mode selection component, a debug mode of the customer journey orchestration application for the customer journey; receiving, by a graphical user interface of the customer journey orchestration application, a user input corresponding to an event of a plurality of events of the customer journey; simulating, by an event simulation component, the event based on the user input and the debug mode; determining, by a status component, a status of the event based on the simulation; and identifying, by a fault identification component, the previously unidentified fault based on the status of the event.

20 Claims, 15 Drawing Sheets

(56) References Cited

U.S. PATENT DOCUMENTS

| | | |
|---|---|---|
| 11,689,663 B2 | 6/2023 | Piaggio et al. |
| 11,829,746 B1 | 11/2023 | Dwivedi et al. |
| 2006/0074714 A1 | 4/2006 | Aziz et al. |
| 2021/0334819 A1* | 10/2021 | Hayes .................. G06Q 30/016 |
| 2022/0405775 A1* | 12/2022 | Siebel .................... G06Q 30/01 |

OTHER PUBLICATIONS

Terrangi, et al., "Optimizing Customer Journey Using Process Mining and Sequence-Aware Recommendation", SAC '19, Apr. 8-12, 2019, pp. 57-65.

Notice of Allowance dated Jan. 31, 2023 in related U.S. Appl. No. 17/659,194.

\* cited by examiner

SYSTEMS AND METHODS FOR CUSTOMER JOURNEY ORCHESTRATION

BACKGROUND

The following relates generally to information technology, and more specifically to customer journey orchestration. Conventional customer journey orchestration systems and methods can leverage data gathered over the course of a customer journey to further tailor the customer experience to attempt to meet the customer's needs and expectations.

However, conventional customer journey orchestration systems and methods currently require a significant investment of time and labor on the part of the entity debugging a customer journey that does not perform as expected. There is therefore need in the art for a method of optimizing the debugging of customer journeys.

SUMMARY

Embodiments of the present disclosure provide a customer journey orchestration application for debugging a customer journey that includes a previously unidentified fault, such as an event that fails to complete or takes longer to complete than expected. The customer journey orchestration application optimizes a customer journey debugging process by providing a debug mode of a customer journey orchestration application to determine a status of an event of a customer journey based on a simulation of the event, and identify the previously unidentified fault based on the status of the event. The customer journey orchestration can display the status and the fault to the user, thereby allowing the user to avoid a lengthy debugging process of manually performing the event in the real world, checking an expected real-world result of the event to determine if the event is complete, and contacting assistance associated with the customer journey, such as a helpdesk, to determine the status of the event if the event does not complete or takes longer to complete than expected.

A method, apparatus, non-transitory computer readable medium, and system for customer journey orchestration are described. One or more aspects of the method, apparatus, non-transitory computer readable medium, and system include identifying, by a customer journey orchestration application, a customer journey having a previously unidentified fault; initiating, by a mode selection component, a debug mode of the customer journey orchestration application for the customer journey; receiving, by a graphical user interface of the customer journey orchestration application, a user input corresponding to an event of a plurality of events of the customer journey; simulating, by an event simulation component, the event based on the user input and the debug mode; determining, by a status component, a status of the event based on the simulation; identifying, by a fault identification component, the previously unidentified fault based on the status of the event; and displaying, using the graphical user interface, an indication of the previously unidentified fault.

A method, apparatus, non-transitory computer readable medium, and system for customer journey orchestration are described. One or more aspects of the method, apparatus, non-transitory computer readable medium, and system include receiving a user input corresponding to an event of a plurality of events in a customer journey, wherein the user input indicates that the event has been completed for a customer profile; identifying a set of conditions associated with a subsequent event of the plurality of events; identifying status information associated with the customer profile; evaluating each condition of the set of conditions based on the status information; determining a status of the subsequent event for the customer profile based on the evaluation; and displaying the status of the subsequent event for the customer profile in a graphical user interface.

An apparatus and system for customer journey orchestration are described. One or more aspects of the apparatus and system include a customer journey orchestration application configured to identify a customer journey having a previously unidentified fault; a mode selection component configured to initiate a debug mode of the customer journey orchestration application for the customer journey; a graphical user interface configured to receive a user input corresponding to an event of a plurality of events of the customer journey; an event simulation component configured to simulate the event based on the user input and the debug mode; a status component configured to determine a status of the event based on the simulation; and a fault identification component configured to identify the previously unidentified fault based on the status of the event.

DETAILED DESCRIPTION

Figure 1:
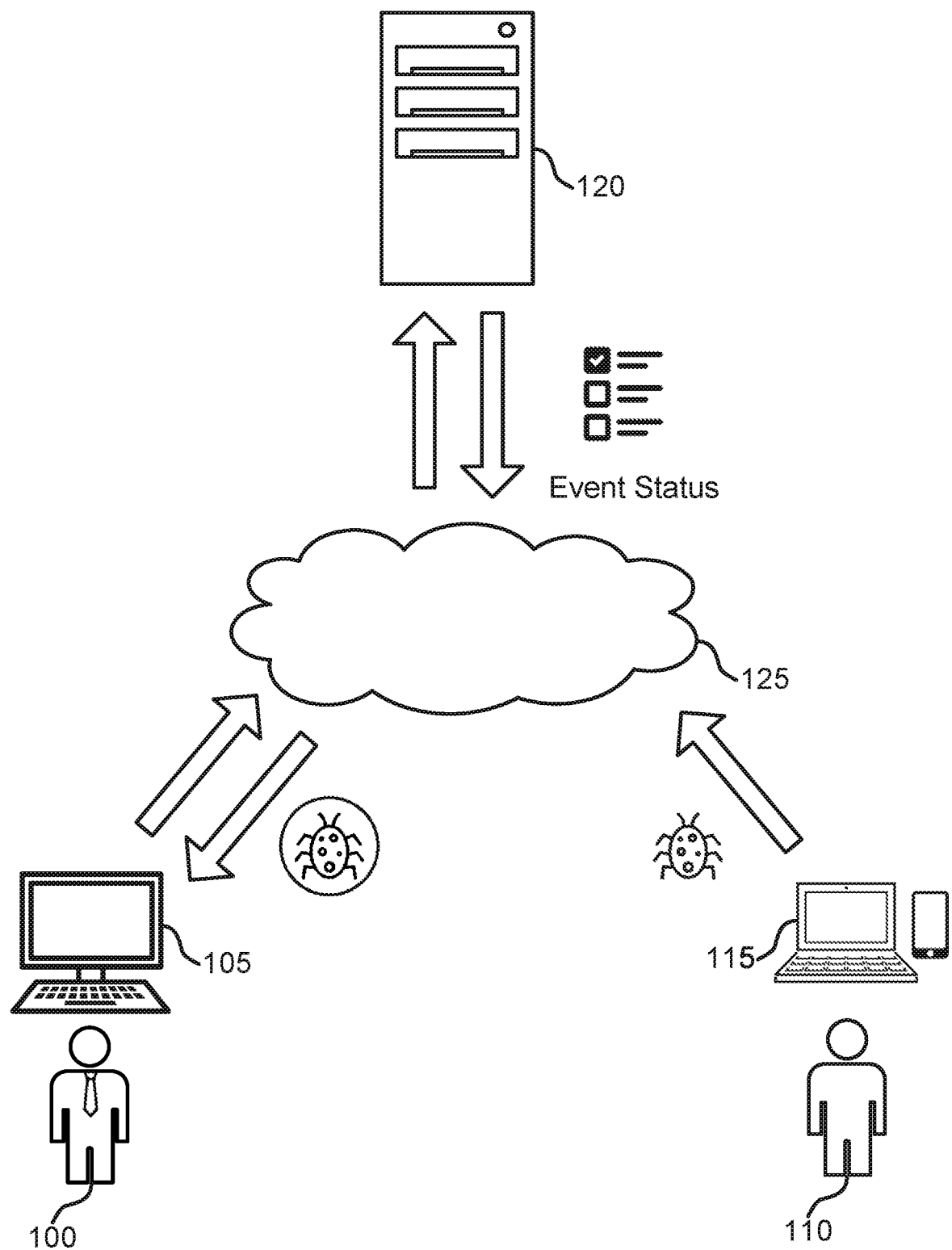
FIG. 1 shows an example of a customer journey orchestration application system according to aspects of the present disclosure.

Conventional customer journey orchestration systems and methods can leverage data gathered over the course of a customer journey to tailor the customer experience to meet the customer's needs and expectations. A customer journey refers to record of a customer's interactions with an entity or a content provider over time. For example, a customer journey can begin with an initial event when a customer visits a brand's digital content channel (e.g., a website). The customer journey may include events describing interactions of the customer with the brand (e.g., subsequent visits to other digital content channels run by the brand, account registrations, purchases made, messages sent and received, actions to be performed as events in response to previous events, etc.).

In some examples, the customer journey is associated with a customer profile (i.e., information about the customer, including a customer identifier such as an email, username, phone number, etc.). Events can be added to the customer journey associated with a profile whenever an entity has knowledge of the customer performing or participating in the event (such as when the customer is logged in to a website using the customer identifier, etc.). In some cases, events in a customer journey can be triggered automatically whenever another event or set of conditions are satisfied. For example, a brand could send an email to a customer that enters information into a website.

However, the designed flow of a customer journey does not always perform as anticipated. Conventional customer journey orchestration systems and methods demand a significant time investment for debugging a customer journey that does not perform as expected. For example, the performance of a subsequent event in a customer journey (such as sending a message) may depend on the completion of an antecedent event (such as a visit to a particular website while logged in to a customer profile).

Thus, the user of a conventional customer journey orchestration platform (e.g., a representative of an entity that is orchestrating the customer journey) may expend a great deal of time and effort on debugging a customer journey that includes a previously unidentified fault, such as an event that does not complete or takes longer to complete than expected. For example, the user might first determine that an event is not properly initiating or completing. The user might then attempt to manually initiate the event by completing any necessary antecedent events for the subsequent event (such as by visiting a particular website using an administrative profile) and observing if a subsequent event occurs as expected. If the subsequent event does not initiate or complete, or takes longer to complete than desired, the user might then contact assistance associated with the conventional customer journey orchestration platform (such as a helpdesk) to determine why the subsequent event failed to initiate, complete, or hanged in a processing state for a long time. There is therefore need in the art for customer journey orchestration systems and methods that streamline the event debugging process.

Systems and methods according to the present disclosure thereby streamline the customer journey orchestration process by reducing the time and effort needed to debug a customer journey that does not perform as expected. For example, in an embodiment, the system includes a customer journey orchestration application that identifies a customer journey that includes a previously unidentified fault, such as an event that fails to initiate or complete or that takes longer to complete than expected. In some cases, the customer journey orchestration application identifies the customer journey based on information received from a customer associated with a customer profile for whom the customer journey is orchestrated, or from a user who has authored or is maintaining the customer journey.

According to some aspects, the customer journey orchestration application includes a mode selection component that initiates a debug mode of the customer journey orchestration application. In some cases, the mode selection component initiates the debug mode in response to a debug mode selection made by a user to a debug mode user interface element displayed in a graphical user interface of the customer journey orchestration application. The graphical user interface receives a user input to an event trigger user interface element and instructs an event simulation component of the customer journey orchestration application to simulate an event in response to the user input.

According to some aspects, the customer journey orchestration application includes a status component that determines a status of the event based on the simulation, thereby allowing the user to avoid performing real-world steps and visits to multiple user interfaces to identify if the event has processed correctly. In some cases, the customer journey orchestration apparatus further includes a fault identification component that identifies the previously unidentified fault based on the status of the event. In some cases, the graphical user interface displays the status of the event and the identified fault to the user.

Therefore, the user is provided with helpful information for determining how to resolve a malfunctioning customer journey. Because the user is provided with the status of the event and the identified fault in a same, convenient-to-use graphical user interface that is used to select a customer journey for debugging and trigger an event for the simulation, the user may easily determine how to edit an event that is identified as the fault in the customer journey to avoid the fault without resorting to using multiple user interfaces and customer journey assistance services.

The term "user" refers to a representative of an entity that is orchestrating or has orchestrated a customer journey for a customer profile. Examples of such an entity include a business, a marketer, an advertiser, a retailer, a logistics company, a supplier, a wholesaler, etc.

The term "customer" refers to a person or group of persons who purchases goods or services from the entity, who potentially purchases goods or services from the entity, who are employees of the entity, etc.

In some cases, the term "customer journey" refers to an ordered series of events that derive from past and future interactions between the entity and the customer. In an example, a customer journey includes events that derive from a commercial relationship, such as contacts between the entity and the user (e.g., visits to digital content channels, retail stores, phone calls, etc.), purchases made by the customer from the entity, and other events typical of such a relationship. Another example of a customer journey includes events that derive from an employer-employee relationship, in which the customer journey is used by the entity to track task assignment, performance, completion, and evaluation, etc.

The term "events" refers to a customer-entity interaction point in a customer journey (such as a website visit, purchase, communication, information update, etc.). Events in a customer journey can include subsequent events that depend on the completion of an antecedent event to be triggered. In an example, a subsequent event is a customer touchpoint (such as a message from the entity to the customer) that is triggered upon the completion of an antecedent event (such as a website visit, a purchase, the presence of a customer device in a geofenced area, etc.). Each event in the customer journey can be associated with a set of conditions stored in a database. Each event can be displayed with a corresponding visual element in a graphical user interface.

The term "customer profile" refers to a collection of information relating to the customer, and includes a customer identifier such as an email address, username, phone number, etc. In some cases, the customer journey orchestration application receives information relating to the performance of a customer journey associated with a customer profile based on an integration between the customer journey orchestration application and a customer device that is logged-in to the customer profile. In some cases, the customer journey orchestration application receives information relating to the performance of a customer journey associated with a customer profile based on an integration between the customer journey orchestration application and a user device that is logged-in to an administrative profile that manages the customer profile and the customer journey associated with the customer profile.

An embodiment of the present disclosure is used in a customer journey debugging context. For example, a user of the system (such as a representative of an entity) has orchestrated (e.g., authored and/or maintained) a customer journey associated with a customer profile for a customer, and the system identifies that the customer journey has a previously unidentified fault. The user uses the system to determine a status of an event in the customer journey based on a simulation of the event, and to identify the previously unidentified fault based on the determination. The system then provides the user with the status and the identified fault, providing the user with helpful information for determining how the user will resolve the fault. An example application of the present disclosure in a customer journey debugging context is provided with reference to FIGS. 1 and 4. Details regarding the architecture of a customer journey orchestration application system are provided with reference to FIGS. 1-3. Examples of a process for customer journey orchestration are provided with reference to FIGS. 4-15.

Customer Journey Orchestration System

Figure 2:
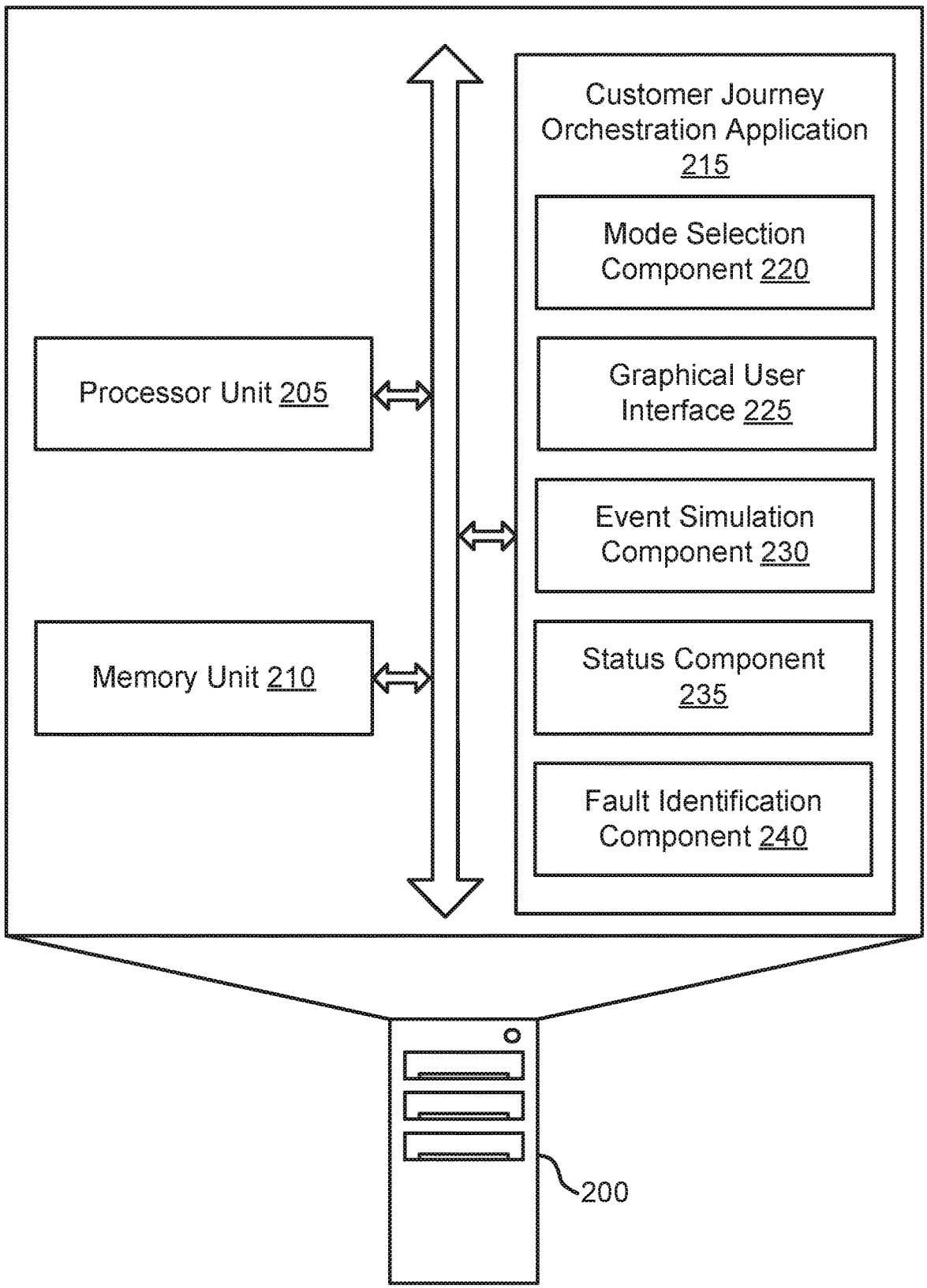
FIG. 2 shows an example of a customer journey orchestration application apparatus according to aspects of the present disclosure.
Figure 3:
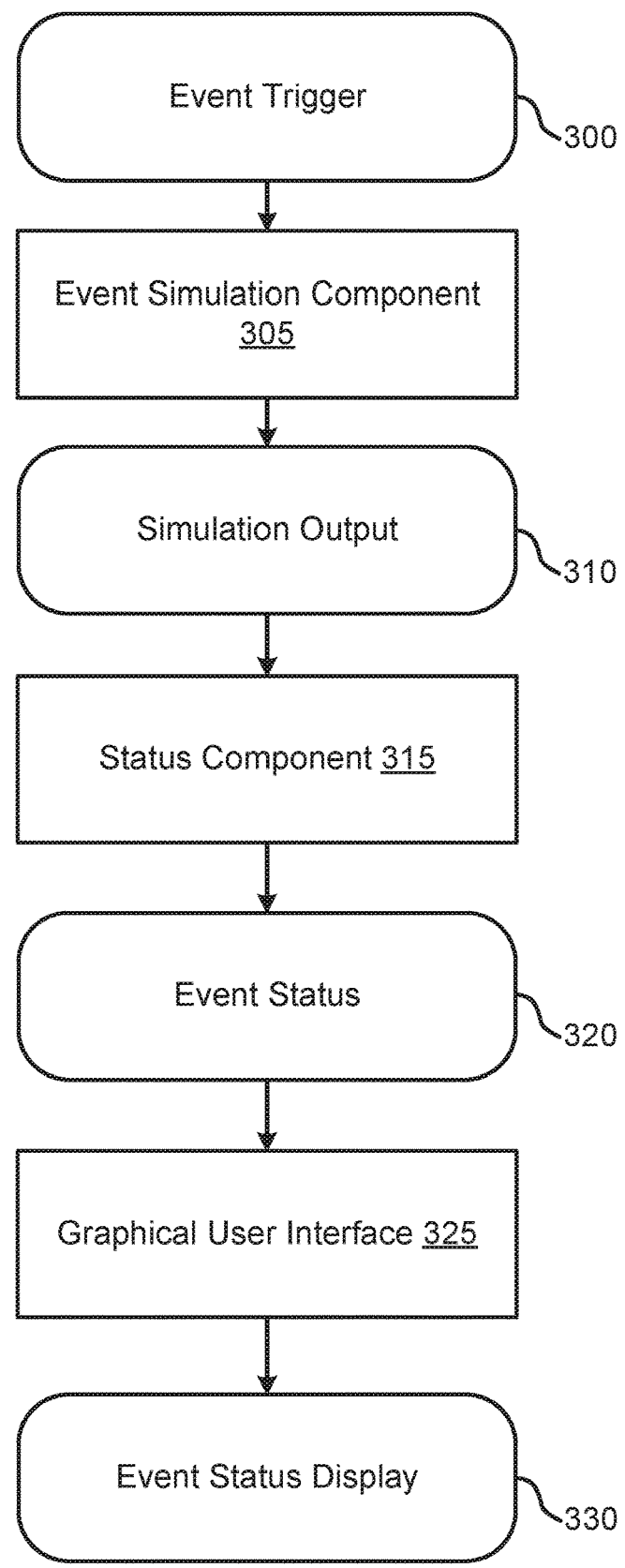
FIG. 3 shows an example of information flow in a customer journey orchestration application system according to aspects of the present disclosure.

In FIGS. 1-3, a system and an apparatus for customer journey orchestration is described. One or more aspects of the apparatus include a customer journey orchestration application configured to identify a customer journey having a previously unidentified fault; a mode selection component configured to initiate a debug mode of the customer journey orchestration application for the customer journey; a graphical user interface configured to receive a user input corresponding to an event of a plurality of events of the customer journey; an event simulation component configured to simulate the event based on the user input and the debug mode; a status component configured to determine a status of the event based on the simulation; and a fault identification component configured to identify the previously unidentified fault based on the status of the event.

In some aspects, the mode selection component is further configured to receive a debug mode selection, wherein the debug mode is initiated in response to the debug mode selection. In some aspects, the graphical user interface is further configured to display an event trigger user interface element for triggering the event based on the debug mode.

In some aspects, the apparatus and system comprise a personal computation device including a software application, wherein the graphical user interface, the event simulation component, the status component, and the fault indication component are included in the software application.

FIG. 1 shows an example of a customer journey orchestration application system according to aspects of the present disclosure. The example shown includes user 100, user device 105, customer 110, customer device 115, customer journey orchestration application apparatus 120, and cloud 125.

Referring to FIG. 1, according to some aspects, customer journey orchestration application apparatus 120 receives a bug report for a customer journey from customer 110 via customer device 115 and cloud 125. In an example, customer device 115 is in a logged-in or otherwise connected state with a customer profile associated with a customer journey for customer 110. A condition of the logged-in or otherwise connected state is that customer device 115 shares information for the customer profile with customer journey orchestration application apparatus 120 via APIs, cookies, or other suitable methods of information sharing. Customer device 115 is thereby integrated with customer journey orchestration application apparatus 120 such that customer journey orchestration application apparatus 120 receives information from customer device 115 relating to events in the customer journey associated with the customer profile.

In an example, customer 110 initiates an event in the customer journey using customer device 115, but the event does not complete, or takes longer than a predetermined amount of time to complete. Software and/or hardware installed on customer device 115 recognizes that the event does not complete, and provides a bug report to customer journey orchestration application apparatus 120 in response to the recognition. The bug report thereby provides information to customer journey orchestration application apparatus 120 such that customer journey orchestration application apparatus 120 identifies the customer journey and that the customer journey has a previously unidentified fault.

In some examples, customer journey orchestration application apparatus 120 notifies user 100, such as by email, SMS message, in-application message or notification, etc., of the customer journey having the previously unidentified fault in response to identifying the customer journey. Then, in response to receiving a debug mode input for the customer journey from user 100 via user device 105 and cloud 125, customer journey orchestration application apparatus 120 initiates a debug mode of a customer journey orchestration application for the customer journey. In response to a user input corresponding to an event of a plurality of events in the customer journey, customer journey orchestration application apparatus 120 simulates the event, determines a status of the event based on the simulation, and identifies the previously unidentified fault based on the status of the event using the customer journey orchestration application. In some embodiments, customer journey orchestration application apparatus 120 then displays the status of the event and or the identified fault to user 100 via user device 105 and the customer journey orchestration application, thereby providing user 100 with helpful information for editing the customer journey to avoid the fault in one convenient and easy-to-use graphical user interface.

In some examples, user 100 becomes aware of a previously unidentified fault in a customer journey prior to customer journey orchestration application apparatus 120 receiving a bug report from customer device 115. In an example, user device 105 is in a logged-in or otherwise connected state with an administrator profile that manages the customer profile, and customer journey orchestration application apparatus 120 thereby receives information produced by the administrator profile for the customer profile. User 100 may attempt to complete an event in the customer journey for the customer profile, and the event does not complete. In this case, user device 105 provides a bug report for the customer journey to customer journey orchestration application apparatus 120, and customer journey orchestration application apparatus 120 identifies the customer journey having the previously unidentified fault from user 100 via user device 105.

In another example, user 100 manually informs customer journey orchestration application apparatus 120 via user device 105 that user 100 would like to debug a customer journey. In this case, customer journey orchestration application apparatus 120 can identify the customer journey having the previously unidentified fault in response to a selection of the customer journey from user 100 in the customer journey orchestration application. After selecting the customer journey, user 100 can provide a debug mode user input to the customer journey orchestration application to initiate the debug mode for the customer journey.

In some embodiments, user device 105 is a personal computer, laptop computer, mainframe computer, palmtop computer, personal assistant, mobile device, or any other suitable processing apparatus. In some examples, user device 105 includes software that can display the graphical user interface of the customer journey orchestration application and can receive and provide user interaction with the graphical user interface. In some examples, user device 105 includes a local instance of the customer journey orchestration application, and the customer journey orchestration application communicates with database servers storing application data for the customer journey orchestration application, application servers hosting the application, and web servers for communicating information between the database servers, the application servers, and user device 105 via cloud 125.

In some examples, user device 105 includes software and/or hardware that integrates user device 105 with customer journey orchestration application apparatus 120. In an example, user device 105 includes software that provides information relating to an administrator profile that manages a customer profile for customer 110 when user 100 uses the software in a logged-in state. In an example, the software is the customer journey orchestration application.

In some examples, customer journey orchestration application apparatus 120 is implemented as user device 105. For example, in some embodiments, user device 105 is a personal computation device including a software application (e.g., the customer journey orchestration application), wherein the graphical user interface, an event simulation component, a status component, and the fault component are included in the software application. User device 105 is an example of, or includes aspects of, the corresponding element described with reference to FIG. 3.

In some embodiments, a user interface enables user 100 to interact with user device 105 and/or customer journey orchestration application apparatus 120. In some embodiments, the user interface includes an audio device, such as an external speaker system, an external display device such as a display screen, or an input device (e.g., a remote control device interfaced with the user interface directly or through an IO controller module). In some cases, the user interface is a graphical user interface (GUI). In some cases, the GUI is implemented as the graphical user interface of the customer journey orchestration application apparatus described with reference to FIG. 2, and the customer journey orchestration application apparatus displays the graphical user interface on user device 105.

In some embodiments, customer device 115 is a personal computer, laptop computer, mainframe computer, palmtop computer, personal assistant, mobile device, or any other suitable processing apparatus. For example, customer device 115 may be a special-purpose hardware device, such as a code scanner, a mobile payment reader, a smart phone, and the like. In some examples, customer device 115 includes software and/or hardware that integrates customer device 115 with customer journey orchestration application apparatus 120. In an example, customer device 115 includes software that provides information relating to a customer profile for customer 110 when customer 110 uses the software in a logged-in state. In an example, customer 110 uses customer device 115 to interact with a digital content channel such as a website, a computer or smartphone app, a messaging service, etc. associated with customer journey orchestration application apparatus 120, and to provide information such as a username, password, contact information, email preferences, etc. to the digital content channel and customer journey orchestration application apparatus 120. Customer journey orchestration application apparatus 120 receives this information from various entities or channels, such as by polling a web server that hosts the website or other digital content channel via an API request, receiving the information directly from customer device 115, or other suitable communication methods.

According to some aspects, customer journey orchestration application apparatus 120 includes the customer journey orchestration application. In some embodiments, customer journey orchestration application apparatus 120 provides a graphical user interface for the customer journey orchestration application to user device 105 via cloud 125 for a user to provide input to the graphical user interface and to display information relating to one or more customer journeys. In some embodiments, customer journey orchestration application apparatus 120 includes one or more processors, a memory subsystem, a communication interface, an I/O interface, one or more user interface components, and a bus. Additionally, in some embodiments, customer journey orchestration application apparatus 120 communicates with user device 105, customer device 115, and/or a database via cloud 125.

In some cases, customer journey orchestration application apparatus 120 is implemented on a server. A server provides one or more functions to users linked by way of one or more of various networks, such as cloud 125. In some cases, the server includes a single microprocessor board, which includes a microprocessor responsible for controlling all aspects of the server. In some cases, a server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

According to some aspects, customer journey orchestration application apparatus 120 is an application server that hosts a customer journey orchestration application described with reference to FIG. 2. In some cases, customer journey orchestration application apparatus 120 communicates with one or more database servers, and one or more web servers via cloud 125 to provide a local instance of the customer journey orchestration application on user device 105 via application server protocols. According to some aspects, customer journey orchestration application apparatus 120 provides a graphical user interface on user device 105 via an HTTP process, and user 100 interacts with the customer journey orchestration application via the graphical user interface.

In some examples, customer journey orchestration application apparatus 120 is a personal computation device including a software application, wherein the graphical user interface, the event simulation component, and the status component are included in the software application.

Further detail regarding the architecture of customer journey orchestration application apparatus 120 is provided with reference to FIGS. 2-3. Further detail regarding a customer journey orchestration process is provided with reference to FIGS. 4-15. Customer journey orchestration application apparatus 120 is an example of, or includes aspects of, the corresponding element described with reference to FIG. 2.

A cloud such as cloud 125 is a computer network configured to provide on-demand availability of computer system resources, such as data storage and computing power. In some examples, cloud 125 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 125 is limited to a single organization. In other examples, cloud 125 is available to many organizations. In one example, cloud 125 includes a multi-layer communications network comprising multiple edge routers and core routers. In another example, cloud 125 is based on a local collection of switches in a single physical location. In some aspects, cloud 125 provides communications between user device 105, customer journey orchestration application apparatus 120, and one or more databases.

A database is an organized collection of data. For example, a database stores data in a specified format known as a schema. In some embodiments, the database is structured as a single database, a distributed database, multiple distributed databases, or an emergency backup database. In some embodiments, a database controller manages data storage and processing in the database. In some cases, user 100 interacts with the database controller. In other cases, the database controller operates automatically without user interaction.

In some cases, the database stores customer profiles, administrator profiles that manage the customer profiles, and information corresponding to the customer profiles and to the administrator profiles, customer journeys for the customer profiles, a rule-based data schema relating to a set of events and sets of conditions corresponding to the set of events, etc. According to some aspects, the database is implemented as one or more database servers that receive, store, and provide information and data for the customer journey orchestration application described with reference to FIG. 2.

FIG. 2 shows an example of a customer journey orchestration application apparatus 200 according to aspects of the present disclosure. In one aspect, customer journey orchestration application apparatus 200 includes processor unit 205, memory unit 210, and customer journey orchestration application 215. In one aspect, customer journey orchestration application 215 includes mode selection component 220, graphical user interface 225, event simulation component 230, status component 235, and fault identification component 240.

According to some aspects, customer journey orchestration application 215 provides a graphical user interface 225 for a customer journey orchestration application 215, where the graphical user interface 225 displays a set of events in a customer journey for a customer profile and an event trigger user interface element for triggering the events in the customer journey. According to some aspects, customer journey orchestration application 215 identifies a customer journey having a previously unidentified fault.

In some aspects, customer journey orchestration application apparatus 200 includes a personal computation device including a software application (i.e., customer journey orchestration application 215), where graphical user interface 225, event simulation component 230, and status component 235 are included in the software application. According to some aspects, the software application also includes mode selection component 220 and fault identification component 240.

According to some aspects, mode selection component 220 initiates a debug mode of the customer journey orchestration application 215 for the customer journey. In some examples, mode selection component 220 receives a debug mode selection, where the debug mode is initiated in response to the debug mode selection.

According to some aspects, mode selection component 220 is configured to initiate a debug mode of the customer journey orchestration application for the customer journey. In some examples, mode selection component 220 is further configured to receive a debug mode selection, wherein the debug mode is initiated in response to the debug mode selection. According to some aspects, mode selection component 220 is implemented as a software component.

According to some aspects, graphical user interface 225 receives a user input corresponding to an event of a set of events of a customer journey. In some examples, graphical user interface 225 displays an event trigger user interface element for triggering the event based on the debug mode. In some examples, graphical user interface 225 displays the status of the event. In some examples, graphical user interface 225 displays an identified fault.

According to some aspects, graphical user interface 225 receives a user input corresponding to an event of a set of events of a customer journey, where the user input indicates that the event has been completed for a customer profile. In some examples, graphical user interface 225 displays the status of the subsequent event. In some examples, graphical user interface 225 updates a color of the subsequent event for the customer journey based on the status of the subsequent event.

According to some aspects, graphical user interface 225 is configured to receive a user input corresponding to an event of a plurality of events of the customer journey. In some aspects, graphical user interface 225 is further configured to display an event trigger user interface element for triggering the event based on the debug mode.

According to some aspects, graphical user interface 225 is configured to display a plurality of events in a customer journey for a customer profile and an event trigger user interface element for triggering the events in the customer journey, and to receive a user input corresponding to an event of the plurality of events based on a user interaction with the event trigger user interface element, wherein the user input indicates that the event has been completed for the customer profile. In some aspects, the graphical user interface 225 is further configured to display the status of an event for the customer profile.

Graphical user interface 225 is an example of, or includes aspects of, the corresponding element described with reference to FIGS. 3, 6-9, and 12-15. According to some aspects, graphical user interface 225 is implemented as a software component.

According to some aspects, event simulation component 230 simulates the event based on the user input and the debug mode. In some aspects, the customer journey includes a directed graph including the set of events and a set of causal relations among the set of events. In some examples, event simulation component 230 identifies a causal relation between the event and an antecedent event from the set of causal relations. In some examples, event simulation component 230 identifies the event based on the causal relation. In some examples, event simulation component 230 transmits a trace event corresponding to each processing step of the simulation, where the status of the event is based on the trace event.

In some examples, event simulation component 230 identifies a set of conditions associated with the event. In some examples, event simulation component 230 evaluates each condition of the set of conditions based on status information. In some examples, event simulation component 230 simulates a customer touchpoint to a customer. In some examples, event simulation component 230 simulates an interaction with a website on a web browser. In some examples, event simulation component 230 tags the event with a session code, where the session code identifies the event as being included in the customer journey.

According to some aspects, event simulation component 230 performs a computation associated with a subsequent event of the set of events. In some aspects, the customer journey includes a directed graph including the set of events and a set of causal relations among the set of events. In some examples, event simulation component 230 identifies a causal relation between the event and the subsequent event from the set of causal relations. In some examples, event simulation component 230 identifies the subsequent event based on the causal relation. In some examples, event simulation component 230 transmits a trace event corresponding to each processing step of the computation, where the status of the subsequent event is based on the trace event.

In some examples, event simulation component 230 identifies a set of conditions associated with the subsequent event. In some examples, event simulation component 230 evaluates each condition of the set of conditions based on the status information. In some examples, event simulation component 230 simulates a customer touchpoint to a customer. In some examples, event simulation component 230 simulates an interaction with a website on a web browser. In some examples, event simulation component 230 tags each event in the set of events with a session code, where the session code identifies an event of the set of events as being included in the customer journey.

According to some aspects, event simulation component 230 is configured to simulate the event based on the user input and the debug mode. According to some aspects, event simulation component 230 is configured to perform a computation associated with a subsequent event of the plurality of events. Event simulation component 230 is an example of, or includes aspects of, the corresponding element described with reference to FIG. 3. According to some aspects, event simulation component 230 is implemented as a software component.

According to some aspects, status component 235 determines a status of the event based on the simulation. In some examples, status component 235 updates status information of a customer profile corresponding to the event based on the user input. In some examples, status component 235 identifies status information associated with the customer profile. In some examples, status component 235 updates a color of the event in the graphical user interface 225 for the customer journey based on the status of the event. In some examples, status component 235 detects a status of the simulated customer touchpoint, where the status of the subsequent event includes the status of the simulated customer touchpoint. In some examples, status component 235 detects a status of the website based on the simulated interaction with the website, where the status of the website includes the status of the simulated interaction.

According to some aspects, status component 235 determines a status of the subsequent event for the customer profile based on the computation. In some examples, status component 235 updates status information of the customer profile corresponding to the event based on the user input. In some examples, status component 235 identifies status information associated with the customer profile. In some examples, status component 235 detects a status of the simulated customer touchpoint, where the status of the subsequent event includes the status of the simulated customer touchpoint. In some examples, status component 235 detects a status of the website based on the simulated interaction, where the status of the website includes the status of the simulated interaction.

According to some aspects, status component 235 identifies status information associated with the customer profile. In some examples, status component 235 determines a status of the subsequent event for the customer profile based on the evaluation. In some examples, status component 235 updates status information of the customer profile corresponding to the event based on the user input. In some examples, status component 235 determines that a condition from the set of conditions is not satisfied, where the status of the subsequent event includes an indication that the condition is not satisfied. In some examples, status component 235 determines that each condition from the set of conditions is satisfied, where the status of the subsequent event includes an indication that the subsequent event is complete.

According to some aspects, status component 235 is configured to determine a status of the event based on the simulation. According to some aspects, status component 235 is configured to determine a status of the subsequent event for the customer profile based on the computation. Status component 235 is an example of, or includes aspects of, the corresponding element described with reference to FIG. 3. According to some aspects, status component 235 is implemented as a software component.

According to some aspects, fault identification component 240 identifies the previously unidentified fault based on the status of the event. According to some aspects, fault identification component 240 is configured to identify the previously unidentified fault based on the status of the event. According to some aspects, fault identification component 240 is implemented as a software component.

FIG. 3 shows an example of information flow in a customer journey orchestration application system according to aspects of the present disclosure. The example shown includes event trigger 300, event simulation component 305, simulation output 310, status component 315, event status 320, graphical user interface 325, and event status display 330.

Referring to FIG. 3, event simulation component 305 receives event trigger 300 from a graphical user interface described with reference to FIG. 2. Event simulation component 305 simulates an event in response to event trigger 300 to determine simulation output 310 and provides simulation output 310 to status component 315. Status component 315 determines event status 320 based on simulation output 310 and provides event status 320 to graphical user interface 325 (e.g., the graphical user interface described with reference to FIG. 2). Graphical user interface 325 provides event status display 330 to a user of the customer journey orchestration application system.

Event simulation component 305 is an example of, or includes aspects of, the corresponding element described with reference to FIG. 2. Status component 315 is an example of, or includes aspects of, the corresponding element described with reference to FIG. 2. Graphical user interface 325 is an example of, or includes aspects of, the corresponding element described with reference to FIGS. 2, 7, 9-10, and 12-15.

Customer Journey Orchestration

In FIGS. 4-15, a method for customer journey orchestration is described. One or more aspects of the method include identifying a customer journey having a previously unidentified fault; initiating a debug mode of the customer journey orchestration application for the customer journey; receiving a user input corresponding to an event of a plurality of events; simulating the event based on the user input and the debug mode; determining a status of the event based on the simulation; and identifying the previously unidentified fault based on the status of the event. Some examples of the method further include tagging the event with a session code, wherein the session code identifies the event as being included in the customer journey.

Some examples of the method further include receiving a debug mode selection, wherein the debug mode is initiated in response to the debug mode selection. Some examples further include displaying an event trigger user interface element for triggering the plurality of events of the customer journey based on the debug mode.

Some examples of the method further include updating status information of the customer profile corresponding to the event based on the user input. In some aspects, the customer journey comprises a directed graph including the plurality of events and a plurality of causal relations among the plurality of events. Some examples of the method further include identifying a causal relation between the event and an antecedent event from the plurality of causal relations. Some examples further include identifying the event based on the causal relation.

Some examples of the method further include transmitting a trace event corresponding to each processing step of the simulation, wherein the status of the event is based on the trace event. Some examples of the method further include identifying a set of conditions associated with the event. Some examples further include identifying status information associated with the customer profile. Some examples further include evaluating each condition of the set of conditions based on the status information. Some examples of the method further include updating a color of the event in the graphical user interface for the customer journey based on the status of the event.

Some examples of the method further include simulating a customer touchpoint to a customer. Some examples further include detecting a status of the simulated customer touchpoint, wherein the status of the subsequent event includes the status of the simulated customer touchpoint. Some examples of the method further include simulating an interaction with a website on a web browser. Some examples further include detecting a status of the website based on the simulated interaction with the website, wherein the status of the website includes the status of the simulated interaction.

One or more aspects of the method include providing a graphical user interface for a customer journey orchestration application, wherein the graphical user interface displays a plurality of events in a customer journey for a customer profile and an event trigger user interface element for triggering the events in the customer journey; receiving a user input corresponding to an event of the plurality of events based on a user interaction with the event trigger user interface element, wherein the user input indicates that the event has been completed for the customer profile; performing a computation associated with a subsequent event of the plurality of events; determining a status of the subsequent event for the customer profile based on the computation; and displaying the status of the subsequent event in the graphical user interface for the customer journey orchestration application.

Some examples of the method further include tagging the event with a session code, wherein the session code identifies the event as being included in the customer journey. Some examples of the method further include updating status information of the customer profile corresponding to the event based on the user input. Some examples of the method further include transmitting a trace event corresponding to each processing step of the computation, wherein the status of the subsequent event is based on the trace event. Some examples of the method further include updating a color of the subsequent event in the graphical user interface for the customer journey based on the status of the subsequent event.

Some examples of the method further include receiving a user mode selection. Some examples further include entering a customer journey test mode in response to the user mode selection, wherein the event trigger user interface element is displayed based on the customer journey test mode.

In some aspects, the customer journey comprises a directed graph including the plurality of events and a plurality of causal relations among the plurality of events. Some examples of the method further include identifying a causal relation between the event and the subsequent event from the plurality of causal relations. Some examples further include identifying the subsequent event based on the causal relation.

Some examples of the method further include identifying a set of conditions associated with the subsequent event. Some examples further include identifying status information associated with the customer profile. Some examples further include evaluating each condition of the set of conditions based on the status information.

Some examples of the method further include simulating a customer touchpoint to a customer based on the computation. Some examples further include detecting a status of the simulated customer touchpoint, wherein the status of the subsequent event includes the status of the simulated customer touchpoint. Some examples of the method further include simulating an interaction with a website on a web browser. Some examples further include detecting a status of the website based on the simulated interaction, wherein the status of the website includes the status of the simulated interaction.

Some examples of the method further include determining that a condition from the set of conditions is not satisfied, wherein the status of the subsequent event includes an indication that the condition is not satisfied. Some examples of the method further include determining that each condition from the set of conditions is satisfied, wherein the status of the subsequent event includes an indication that the subsequent event is complete.

Figure 4:
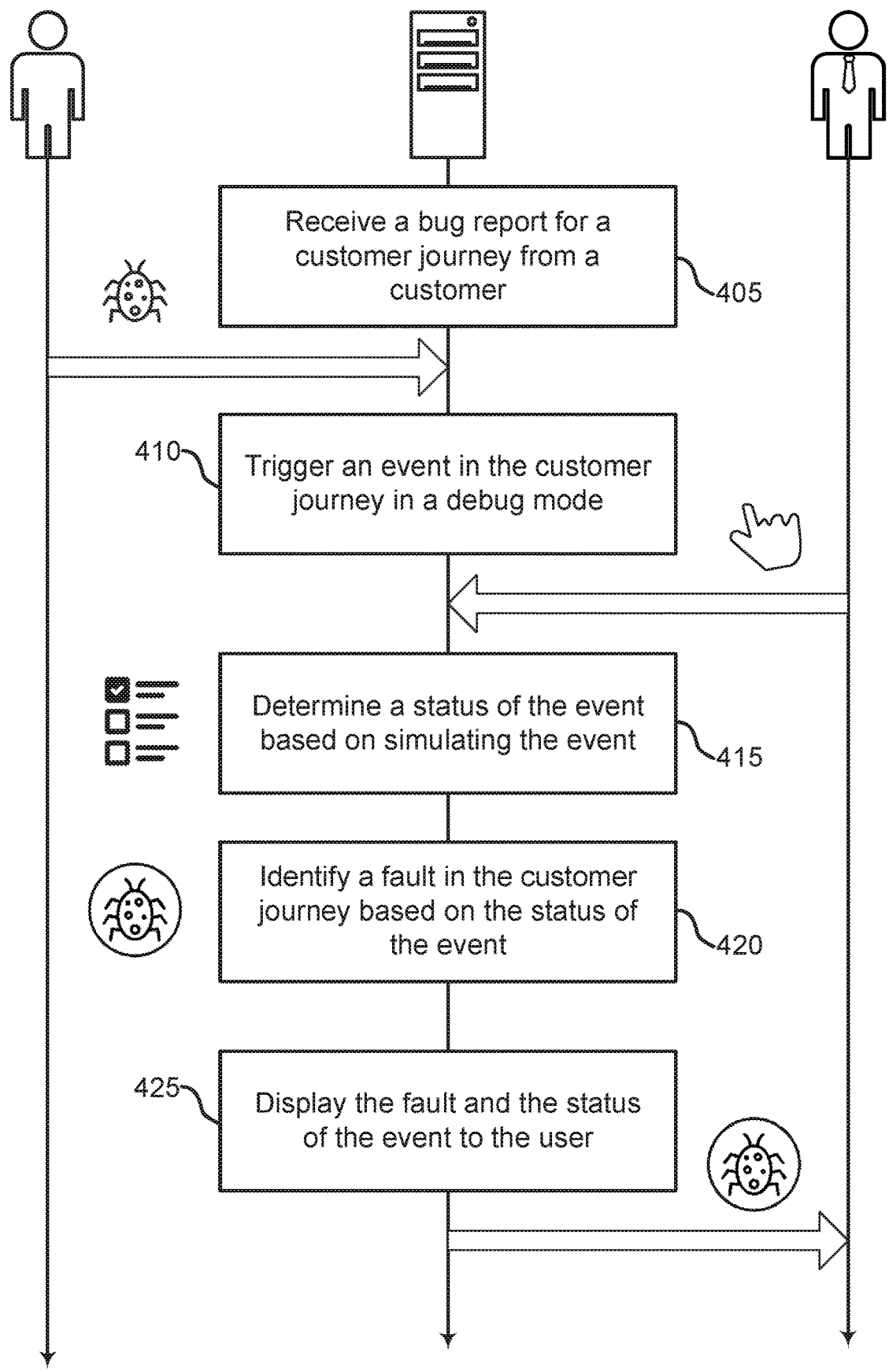
FIG. 4 shows an example of customer journey debugging according to aspects of the present disclosure.

FIG. 4 shows an example of customer journey debugging according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, some embodiments of the present disclosure are used in a customer journey debugging context. For example, a user of the system (such as a representative of an entity) has orchestrated (e.g., authored and/or maintained) a customer journey associated with a customer profile for a customer, and the system identifies that the customer journey has a previously unidentified fault.

In some cases, the entity is a business orchestrates a customer profile for a customer. Examples of such an entity include a business, a marketer, an advertiser, a retailer, a logistics company, a supplier, a wholesaler, etc. Examples of the customer include a person or group of persons who purchases goods or services from the entity, who potentially purchases goods or services from the entity, who are employees of the entity, etc.

In some embodiments, a customer journey is an ordered series of events that derive from past and future interactions between the entity and the customer. In an example, a customer journey includes events that derive from a commercial relationship, such as contacts between the entity and the user (e.g., visits to digital content channels, retail stores, phone calls, etc.), purchases made by the customer from the entity, and other events typical of such a relationship. Another example of a customer journey includes events that derive from an employer-employee relationship, in which the customer journey is used by the entity to track task assignment, performance, completion, and evaluation, etc. In some embodiments, the customer journey includes antecedent events and subsequent events, where a subsequent event is initiated in response to the completion of one or more antecedent events. An example of such a fault is an event that fails to initiate or complete as expected, or completes after a longer duration than expected. In some embodiments, a customer profile is a collection of information relating to the customer, and includes a customer identifier such as an email address, username, phone number, etc.

After the system identifies the customer journey having the previously unidentified fault, the user uses the system to debug the customer journey by simulating an event in the customer journey, determine a status of the event based on the simulation, and identify the previously unidentified fault based on the status of the event. The system then displays the status of the event and/or the identified fault to the user, thereby providing the user with helpful information for determining how to correct the fault.

For example, the user may determine, given the displayed status and identified fault, whether the event is in a processing state, a completed state, or a failed state, and the reasons why the subsequent event is in the processing state, the completed state, or the failed state. The user may also determine how long each step of the event is in the processing state.

At operation 405, the system receives a bug report for a customer journey from a customer. In some cases, the operations of this step refer to, or may be performed by, a customer journey orchestration application apparatus as described with reference to FIGS. 1 and 2. In an example, a customer device is in a logged-in or otherwise connected state with a customer profile associated with a customer journey for the customer. A condition of the logged-in or otherwise connected state is that the customer device shares information for the customer profile with the customer journey orchestration application apparatus via APIs, cookies, or other suitable methods of information sharing. The customer device is thereby integrated with customer the journey orchestration application apparatus such that the customer journey orchestration application apparatus receives information from the customer device relating to events in the customer journey associated with the customer profile.

In some examples, the customer initiates an event in the customer journey using the customer device, but the event does not complete. Software and/or hardware installed on the customer device recognizes that the event does not complete, and provides a bug report to the customer journey orchestration application apparatus in response to the recognition. The bug report thereby provides information to the customer journey orchestration application apparatus such that the customer journey orchestration application apparatus identifies the customer journey and that the customer journey has a previously unidentified fault based on the bug report.

In an example, the user becomes aware of a previously unidentified fault in a customer journey prior to the customer journey orchestration application apparatus receiving the bug report from the customer device. In an example, a user device is in a logged-in or otherwise connected state with an administrator profile that manages the customer profile, and the customer journey orchestration application apparatus thereby receives information produced by the administrator profile for the customer profile. The user may attempt to complete an event in the customer journey for the customer profile, and the event does not complete. In this case, the user device provides a bug report for the customer journey to the customer journey orchestration application apparatus, and the customer journey orchestration application apparatus identifies the customer journey having the previously unidentified fault based on the bug report from the user via the user device.

In another example, the user manually informs the customer journey orchestration application apparatus via the user device that the user would like to debug a customer journey. In this case, the customer journey orchestration application apparatus can identify the customer journey having the previously unidentified fault in response to a selection of the customer journey from the user in a customer journey orchestration application included in the customer journey orchestration application apparatus.

In some examples, the customer journey orchestration application apparatus notifies the user, such as by email, SMS message, in-application message or notification, etc., of the customer journey having the previously unidentified fault in response to identifying the customer journey.

At operation 410, the system triggers an event in the customer journey in a debug mode. In some cases, the operations of this step refer to, or may be performed by, a customer journey orchestration application apparatus as described with reference to FIGS. 1 and 2. In an example, the customer journey orchestration application initiates a debug mode in response to a user input to a debug mode user interface element displayed in a graphical user interface of the customer journey orchestration application. An example of a debug mode user interface element is described with reference to FIG. 7. After the debug mode is initiated, in some examples, the graphical user interface displays the customer journey and/or an event trigger user interface element. An event trigger user interface element is described with reference to FIGS. 7 and 9.

In some examples, after receiving a user input to the event trigger user interface element via the graphical user interface, the customer journey orchestration application triggers an event in the customer journey. According to some aspects, the customer journey orchestration application triggers the event by indicating that the event is ready to be simulated. In some embodiments, the event is a subsequent event that is triggered in response to an indication that one or more antecedent events for the subsequent event are completed (e.g., in a complete status), and the user input is an indication to the customer journey orchestration apparatus that one or more antecedent events are complete.

At operation 415, the system determines a status of the event based on simulating the event. In some cases, the operations of this step refer to, or may be performed by, a customer journey orchestration application apparatus as described with reference to FIGS. 1 and 2. In an example, the customer journey orchestration application simulates the event as described with reference to FIG. 5. In an example, the customer journey orchestration application determines a status of the subsequent event based on the simulation as described with reference to FIG. 5.

At operation 420, the system identifies a fault in the customer journey based on the status of the event. In some cases, the operations of this step refer to, or may be performed by, a customer journey orchestration application apparatus as described with reference to FIGS. 1 and 2. In some embodiments, the customer journey orchestration application identifies the fault by determining that an event has a failed status, or by determining that an event is or was in a processing state for longer than a predetermined amount of time (where the predetermined amount of time may be a threshold amount of time that is determined at the time the event is added to the customer journey, or is later edited).

At operation 425, the system displays the fault and the status of the event to the user. In some cases, the operations of this step refer to, or may be performed by, a customer journey orchestration application apparatus as described with reference to FIGS. 1 and 2. In an example, the customer journey orchestration apparatus displays the status of the event to the user as described with reference to FIGS. 5, 10, and 12-15. In an example, the customer journey orchestration apparatus displays the fault to the user as described with reference to FIGS. 5 and 15.

After the user is provided with the event status and the fault by the customer journey orchestration application apparatus, the user can adjust or remove an event corresponding to the fault from the customer journey, thereby orchestrating the user journey without testing the event themselves by providing real-world conditions for the event to initiate and complete, monitoring the event in the real world, and then contacting assistance such as a third-party helpdesk associated with the customer journey orchestration to determine how the fault can be resolved.

Figure 5:
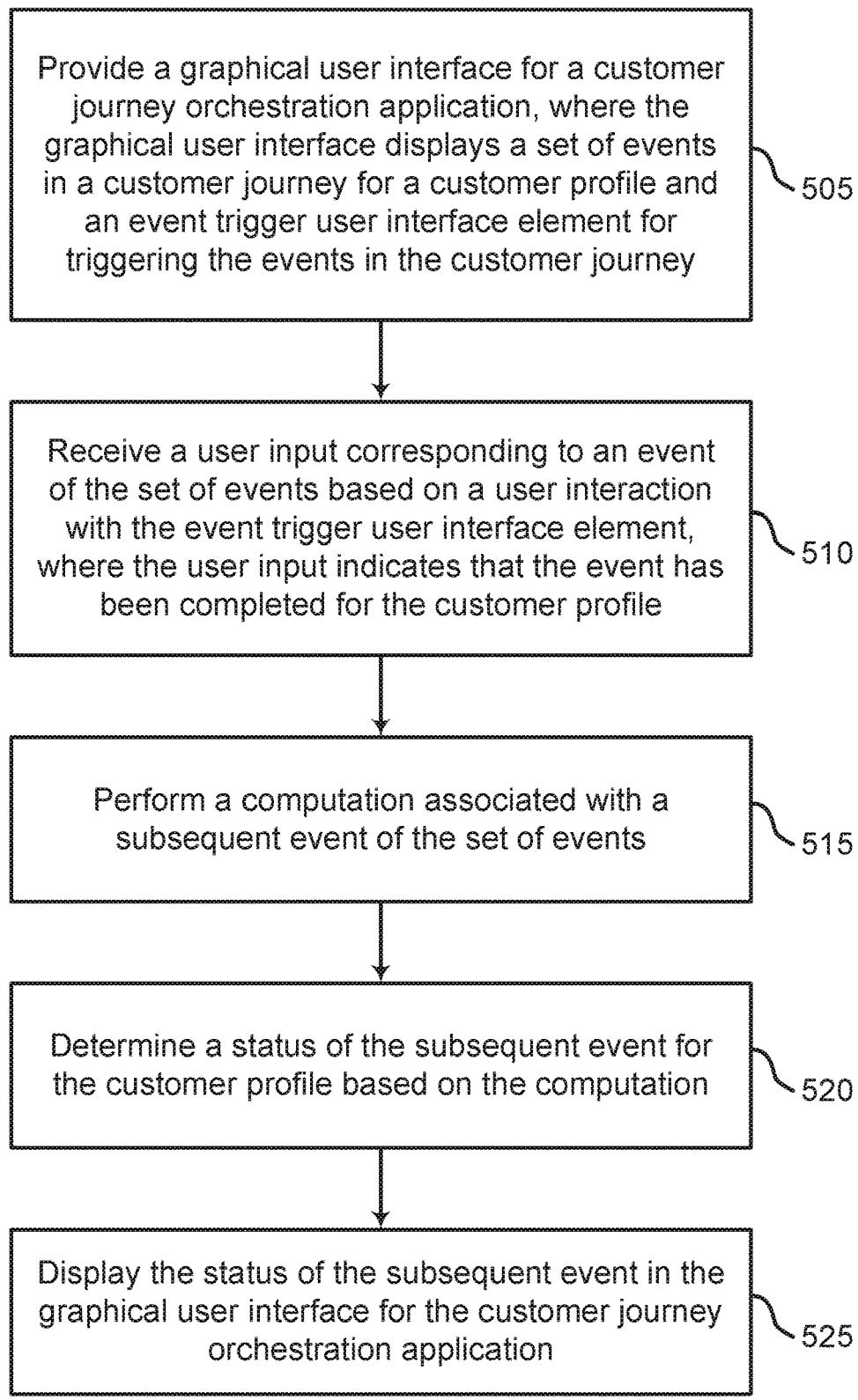
FIG. 5 shows an example of displaying a subsequent event status according to aspects of the present disclosure.

FIG. 5 shows an example of displaying an event status according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, a customer journey orchestration application provides a graphical user interface for a user to trigger one or more events in a customer journey for a customer profile. In some embodiments, the event is a subsequent event in the customer journey, and the user triggers the subsequent event by indicating that one or more antecedent events for the subsequent event is complete. According to some embodiments, a user of the system chooses a customer journey for the customer profile by selecting the customer profile from a plurality of customer profiles displayed by the graphical user interface. According to some aspects, a customer profile is a collection of information relating to a customer, and includes a customer identifier such as an email address, username, phone number, etc., and the customer journey is an ordered series of events that correspond to the customer profile. According to some embodiments, the system simulates the event by performing a computation for the event, determining a status of the subsequent event based on the computation, and displays the status of the event and/or other events in the set of events to the user via the graphical user interface.

At operation 505, the system provides a graphical user interface for a customer journey orchestration application, where the graphical user interface displays a set of events in a customer journey for a customer profile and an event trigger user interface element for triggering the events in the customer journey. In some cases, the operations of this step refer to, or may be performed by, a customer journey orchestration application as described with reference to FIG. 2. In an example, the customer journey orchestration application displays the graphical user interface on a user device as described with reference to FIG. 1. In some examples, the event trigger user interface element is an interactive button, icon, image, etc. According to some aspects, the event trigger user interface element is labeled with nearby text in the graphical user interface. An example in which the event trigger user interface element is an interactive button labeled with the text "Trigger an event" is described with reference to FIG. 9.

According to some aspects, an event simulation component described with reference to FIG. 2 tags at least one event of the set of events with a session code that identifies the event as being included in the customer journey. In an example, the set of events is associated with the customer journey in a data schema stored in a database, such as the database described with reference to FIG. 1. In some examples, the event simulation component tags the at least one event with the session code to include the event in the customer journey displayed on the graphical user interface based on the data schema and in response to a user selection of the customer profile. According to some embodiments, the event simulation component automatically tags the at least one event based on the data schema. According to some embodiments, the event simulation component tags the at least one event based on a user selection in response to a prompt to select the at least one event, where the prompt is displayed on the graphical user interface. In some embodiments, the session code is based on information included in the directed graph described with reference to FIG. 8, such that events identified based on the directed graph are tagged with the session code.

According to some aspects, a mode selection component described with reference to FIG. 2 receives a debug mode selection via the graphical user interface. In an example, the graphical user interface displays a debug mode user interface element (an interactive visual element) corresponding to the debug mode, such as a button, icon, image, etc. In the example described with reference to FIG. 7, the interactive visual element is a toggle button labeled "Debug", and the mode selection component receives a user interaction with the interactive visual element such as a mouse click or a touch input to the toggle button via the graphical user interface.

According to some aspects, the mode selection component initiates a debug mode for the customer journey orchestration application in response to the debug mode selection. In an example, the event trigger user interface element is displayed by the graphical user interface based on the debug mode. In the example described with reference to FIG. 7, in response to the debug mode selection (e.g., clicking the toggle button labeled "Debug"), the graphical user interface displays the event trigger user interface element (the button labeled "Trigger an event") and enters the customer journey orchestration application into the debug mode. According to at least one embodiment, during the debug mode, the graphical user interface accepts a user input corresponding to an event of the set of events based on a user interaction with the event trigger user interface element.

In some examples, the mode selection component instructs the graphical user interface to display the customer journey in response to the debug mode selection. In some examples, the graphical user interface offers a choice to the user of displaying one or more events in the customer journey. In some examples, the graphical user interface displays one or more related events (such as one or more antecedent events and one or more subsequent events that depend on the completion of the one or more antecedent events) in response to a user selection. In an example, the customer journey orchestration application determines a relation between the one or more events as described with reference to FIG. 8.

At operation 510, the system receives a user input corresponding to an event of the set of events based on a user interaction with the event trigger user interface element, where the user input indicates that the event has been completed for the customer profile. In some cases, the operations of this step refer to, or may be performed by, a graphical user interface as described with reference to FIGS. 2-3, 6-7, 9-10, and 12-15.

Figure 12:
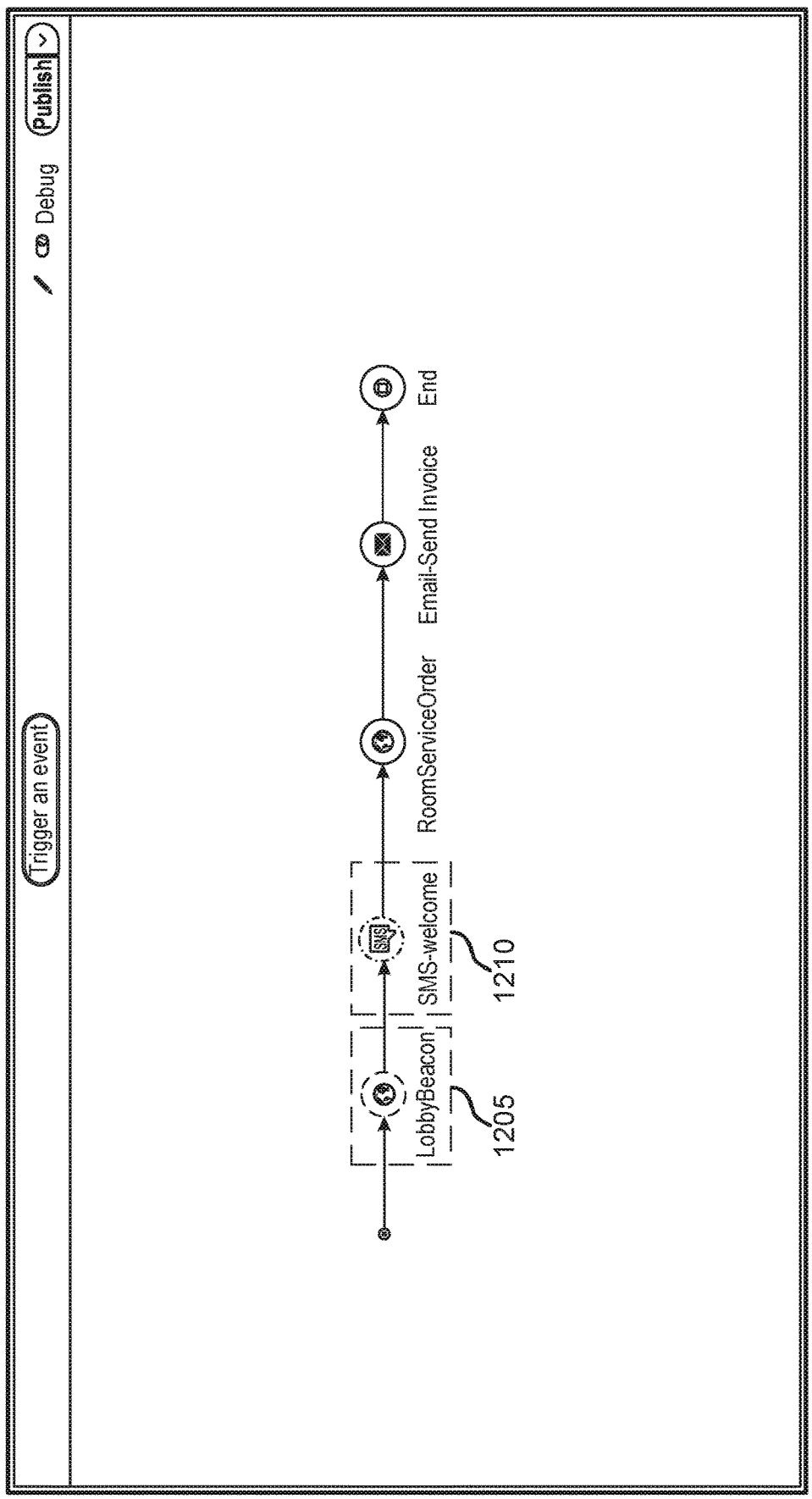
FIG. 12 shows an example of displaying a status for one or more events of a customer profile according to aspects of the present disclosure.

In an example, the graphical user interface receives a user input to the event trigger user interface element (such as a mouse click or touch press), and in response, the customer journey orchestration application marks the event as complete. Therefore, the user interaction indicates that the event is completed for the customer profile, where "completed" refers to the event being in a "complete" state. In the example of FIG. 12, the completed event is a "LobbyBeacon" event, in which a user device enters a lobby of a hotel. For purposes of testing subsequent events that depend on the completion of the "LobbyBeacon" event, the user input indicates that the "LobbyBeacon" event is completed (e.g., in a success state). In at least one embodiment, the graphical user interface displays a "processing" state while the customer journey orchestration apparatus processes the user input (for example, by displaying a colored outline around the event, text indicating the processing state, etc.), and a "completed" state when the customer journey orchestration apparatus has finished processing the user input (for example, by displaying a second colored outline around the event, text indicating the completed state, etc.). In this example, "LobbyBeacon" is an antecedent event for the event "SMS-welcome".

In an embodiment, the user first selects an event to indicate is completed by providing an input to an interactive visual element associated with the event, and then providing an input to the event trigger user interface element while the event is selected. In an embodiment, the user input is a first input to the visual element corresponding to the event that prompts the graphical user interface to display a context menu, and a second user input is made to an option in the context menu to indicate that the event is complete. In the example described with reference to FIG. 9, the user interaction is with an event trigger user interface element that is implemented as an interactive button labeled with the text "Trigger an event". In this case, the graphical user interface can display a pop-up window including a list of events in response to the user interaction, and a second user input to an event from the list of events in the pop-up window can indicate that the event is complete. According to some aspects, a user input to the event trigger user interface element is not an indication that an event is complete, but is instead an indication that a simulation of the event should be initiated.

At operation 515, the system performs a computation associated with an event of the set of events. In at least one embodiment, the event is a subsequent event. In some cases, the operations of this step refer to, or may be performed by, an event simulation component as described with reference to FIGS. 2 and 3. According to at least one embodiment, the event simulation simulates the event by performing the computation based on the user input and the debug mode. For example, when the customer journey orchestration application is in the debug mode, the graphical user interface receives an input to the event trigger user interface element, thereby instructing the event simulation component to trigger the event. In this case, the event simulation component triggers the event by initiating the simulation of the event. According to at least one embodiment, the system performs a computation associated with the event of the set of events as described with reference to FIG. 11.

According to some aspects, the event simulation component transmits a trace event corresponding to each processing step of the computation. The term "trace event" refers to a step in an event that is simulated by the event simulation component to test an event in the customer profile. The event simulation component simulates event steps using various event simulation algorithms and processes according to various embodiments, such that the simulation algorithms and processes attempt to satisfy each condition in a set of conditions associated with the event.

In at least one embodiment, the event simulation component simulates events using simulation algorithms and processes implemented using the Java programming language. In some embodiments, the event simulation component simulates events by polling external event simulator processes via an API and receiving results from the external event similar processes. In at least one embodiment, the event simulation component transmits a trace event corresponding to each step of the computation by transmitting a simulated step corresponding to a condition in the set of conditions associated with the event. In an example, when the event simulation component performs a computation by determining that a subsequent event depends on the completion of an antecedent event, and that there are a set of conditions associated with the subsequent event, the event simulation component transmits a trace event for each condition of the set of conditions associated with the subsequent event.

At operation 520, the system determines a status of the event for the customer profile based on the computation. In some embodiments, the event is a subsequent event. In some embodiments, the system determines a status of the event for the customer profile based on the evaluation described with reference to FIG. 11. In some cases, the operations of this step refer to, or may be performed by, a status component as described with reference to FIGS. 2 and 3.

According to some aspects, the status of the event is based on the trace event. In an example, the trace event is used by the status component to determine the status of the event. For example, while the trace event is being transmitted, the status component determines the status of the event associated with the trace event as being in process, or other such similar state. The status component also determines the length of time that the trace event is in process, based on a start time when the trace event is initiated and an end time when the trace event is received. Thereafter, the status component determines a status of the subsequent event based on the trace event, the computation, and/or the evaluation described with reference to FIG. 11.

According to some aspects, the event simulation component transmits the trace event to the status component according to the event simulation algorithms and processes that are implemented by the status component. If the status component receives every trace event corresponding to every condition in the set of conditions associated with the event, then the status component determines the status of the event to be complete. If the status component does not receive a trace event associated with the event, then the status component determines the status of the event as failed. According to some aspects, a failed status includes a text description of why the event failed, based on a description of which condition in the set of conditions associated with the event is not satisfied.

According to some aspects, the event simulation component simulates a customer touchpoint to a customer based on the computation. For example, the trace event corresponds to an event that includes a customer touchpoint to a customer, such as an email, an SMS message, etc., and the trace event is a step relating to a simulated customer touchpoint event based on a set of conditions associated with the event determined by the computation. According to some aspects, the status component detects a status of the simulated customer touchpoint, where the status of the event includes the status of the simulated customer touchpoint. For example, the status component detects the status of the simulated customer touchpoint by determining if it received a trace event associated with the simulated customer touchpoint, and includes the determination in the status of the event.

According to some aspects, the event simulation component simulates an interaction with a website on a web browser. According to some aspects, the status component detects a status of the website based on the simulated interaction, where the status of the website includes the status of the simulated interaction. For example, the trace event corresponds to an event that includes an interaction with a website on a web browser, or a response to an interaction on a website, such as content being displayed on the website in response to a clicking a hyperlink, scrolling to a particular portion of the website, visiting the website using a device located in a particular physical area, a shopping cart notification in response to an item being placed in a virtual shopping cart, etc.

In an example, the user input can correspond to an indication that an antecedent event is complete, and the trace event corresponds to a simulated website interaction that depends on the antecedent event according to a rule-based data schema and a set of conditions associated with the subsequent event. In another example, the user input corresponds to an indication to trigger a simulated interaction with a website that does not depend on a completion of an antecedent event. In at least one embodiment, the simulation component simulates a change in a status of the website as part of simulating the trace event (such as content displayed on the website, etc.), and the status component detects the status of the website based on the information provided by the simulation component.

At operation 525, the system displays the status of the event in the graphical user interface for the customer journey orchestration application. In some cases, the operations of this step refer to, or may be performed by, a graphical user interface as described with reference to FIGS. 2-3, 6-7, 9-10, and 12-15. According to some aspects, the graphical user interface receives the status of the event and information associated with the status from the status component (such as historical status data corresponding to the set of conditions associated with the event), and displays the status and/or information associated with the status to the user.

According to some aspects, the graphical user interface displays the status through a visual element. In at least one embodiment, the graphical user interface updates a color of the displayed event visual element based on the status of the event. For example, if the status of the event is "in process", an element of the displayed event, such as a perimeter border element surrounding the displayed subsequent event, can be updated from an initial color to a first new color, such as yellow, or from an initial shape to a first new shape, etc. Likewise, if the status of the event is "complete", the color can be updated to a second new color, such as green, etc. Likewise, if the status of the event is "failed", the color can be updated to a third new color, such as red, etc.

Figure 13:
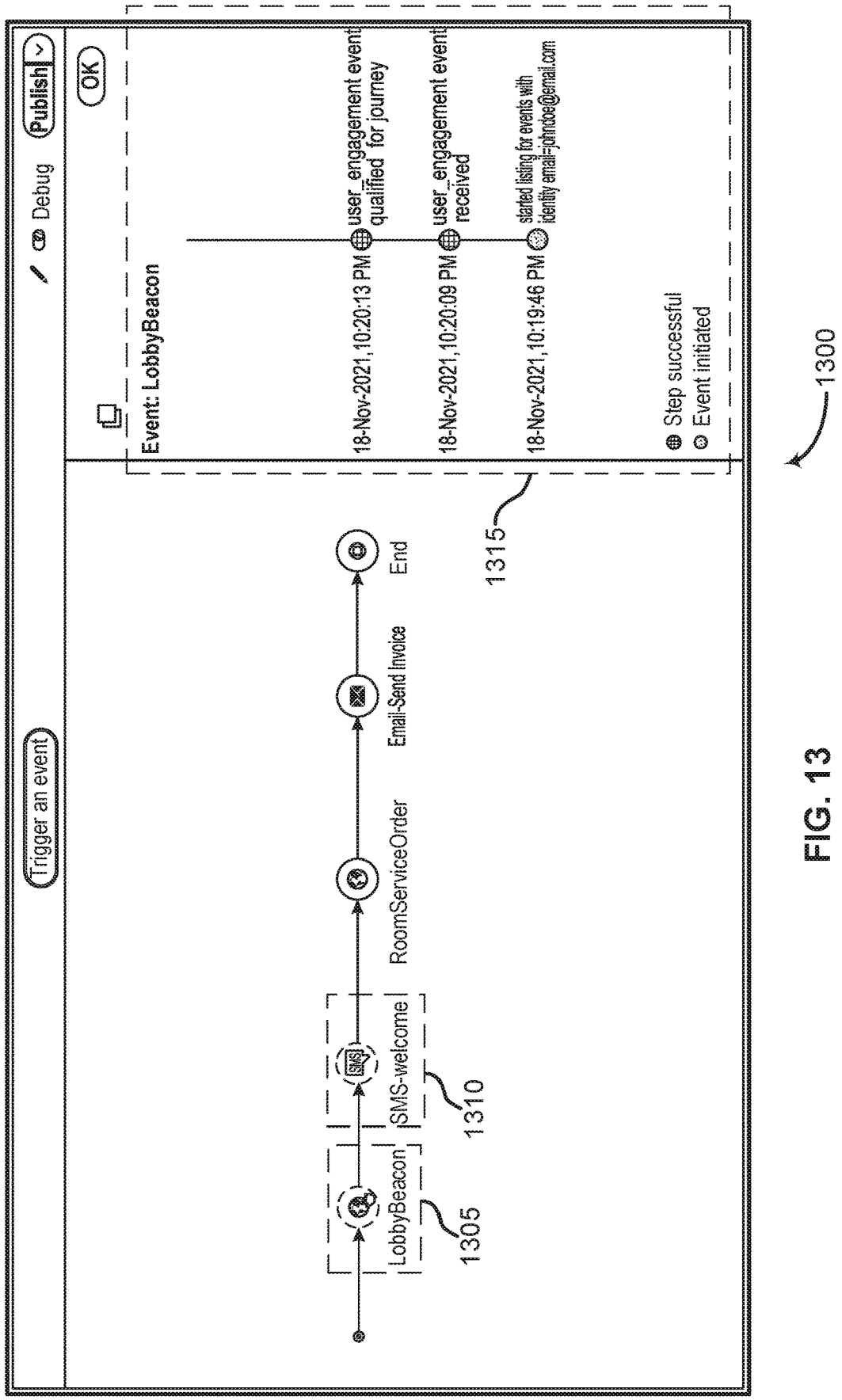
FIG. 13 shows an example of displaying status information for an antecedent event according to aspects of the present disclosure.
Figure 14:
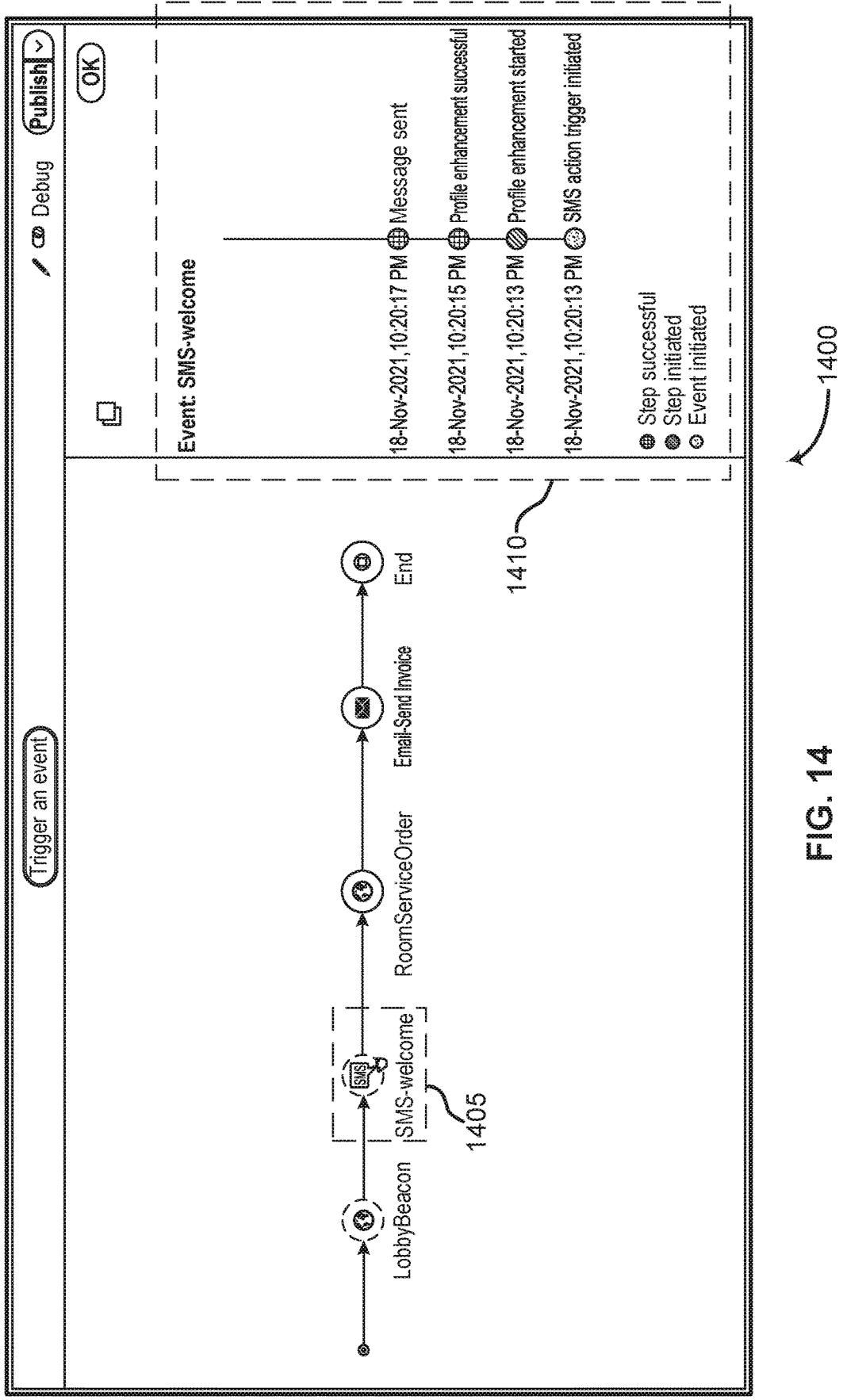
FIG. 14 shows an example of displaying status information for a subsequent event according to aspects of the present disclosure.

According to some aspects, the graphical user interface displays the information associated with the status of the event in response to a user interaction with a displayed event in the customer journey. In an example, the event is displayed as an interactive visual element such as a button, icon, image, etc., and a user interaction with the interactive visual element brings up a pop-up window, sidebar tab, etc. that includes the status of the event based on a user indication of an event being complete if the event is an antecedent event, or status information and information associated with the status determined by the status component if the event is a subsequent event or an event that is triggered independently of other events in the customer journey. Examples of displaying a status of an event and information associated with the status through a visual context are illustrated in FIGS. 13-15.

According to some aspects, by displaying information associated with the status of the event, where status information corresponds to each condition of a set of conditions, the graphical user interface provides the user with time information associated with each condition, determined as described with reference to FIG. 11. Therefore, the user is provided with the length of time that a step in an event is in a "processing" state, and is able to compare the length of time with an expected processing time for the event. Because the time information is also associated with descriptive status information relating to the set of conditions, the user is provided with information to determine which conditions of the set of conditions is contributing most to prolonging the "processing" state of the event, helping the user to avoid relying on contacting outside help to determine why an event is hanging.

According to some aspects, the status component determines that a condition from the set of conditions is not satisfied, wherein the status of the event includes an indication that the condition is not satisfied. For example, according to some aspects, the status component determines if the condition is not satisfied by determining that it has failed to receive a trace event for a condition associated with the event that the status component expected to receive from the event simulation component. If the status component does not receive the trace event for a condition, then the condition is not satisfied. The status component then refers to the set of conditions, the status information, and/or information generated by the event simulation component while simulating the event to determine why the condition is not satisfied, and includes an indication that the condition is not satisfied in the status by including a text description of the reason the condition is not satisfied.

Figure 15:
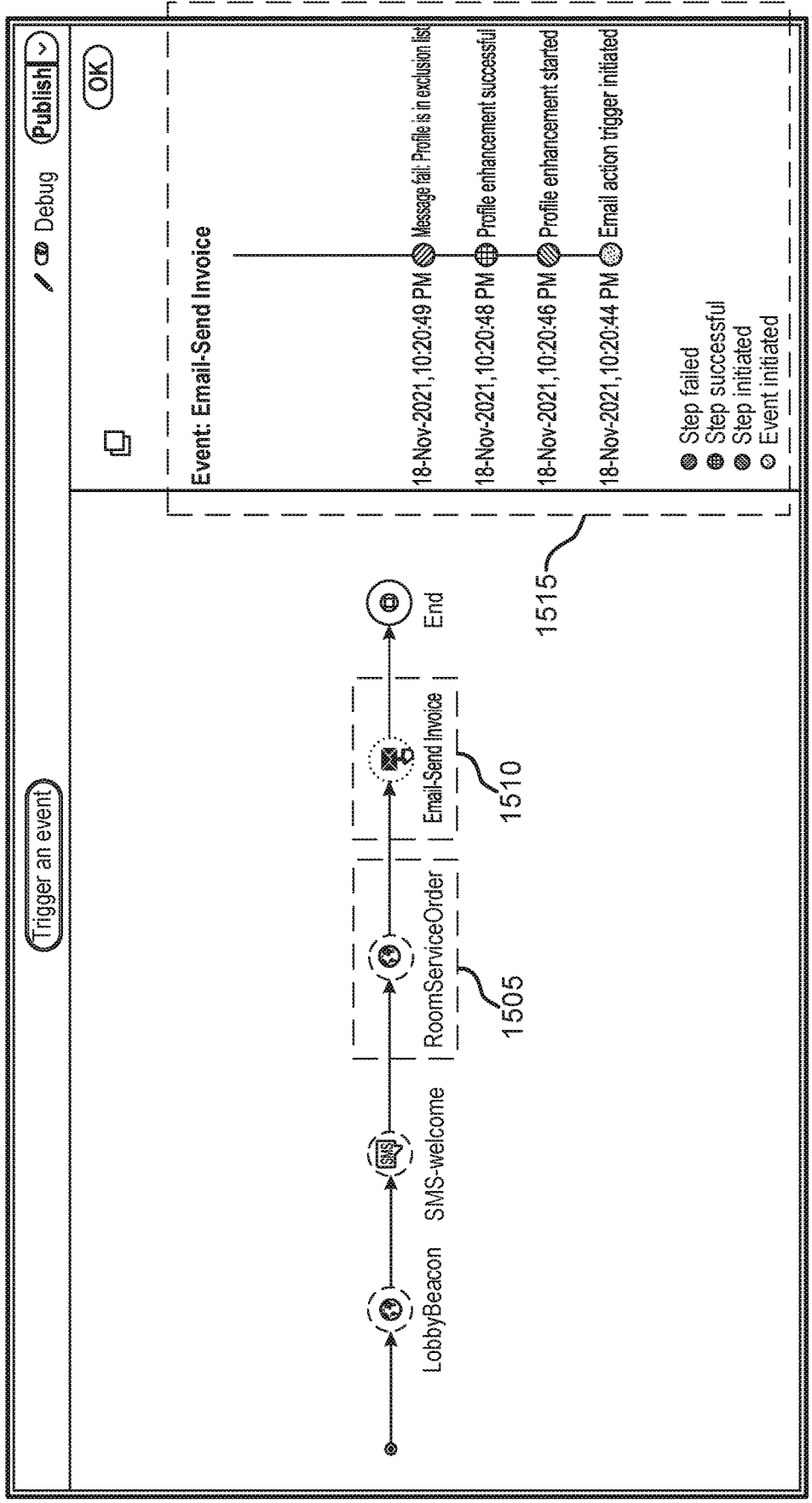
FIG. 15 shows an example of displaying status information for a failed event according to aspects of the present disclosure.

In the example illustrated in FIG. 15, the status of the subsequent event "Email-Send Invoice" is "Message fail", and the status includes the indication that a condition associated with the "Email-Send Invoice" subsequent event is not satisfied: "Profile is in exclusion list". In this example, a condition of an ability for the customer to receive emails is not satisfied, as determined by information provided from the event simulation component to the status component via a trace event. The graphical user interface provides the user with the failed status of the subsequent event, and information detailing why the subsequent event failed to complete. Therefore, the customer journey orchestration application apparatus allows the user to avoid a testing process of triggering the actual subsequent event, waiting for the subsequent event to occur, and requesting information from a helpdesk technician or engineer in order to learn why the subsequent event did not occur.

Similarly, according to some aspects, the status component determines that each condition from the set of conditions is satisfied, wherein the status of the event includes an indication that the event is complete. In an example illustrated in FIG. 14, each condition of the set of conditions associated with the subsequent event "SMS-welcome" is satisfied, and the status includes a text description of the status indicating that a final condition of the set of conditions associated with the subsequent event is satisfied: "Message sent".

According to some aspects, the fault identification component identifies a previously unidentified fault based on the status of the event. In an example, the fault identification component compares time information associated with a "processing" status for each step of the simulation of the event with a predetermined amount of time that is allocated by the user and/or the customer journey orchestration application for steps of events to be in a processing state. If the fault identification component determines that the simulation step is in a processing state for longer than the predetermined amount of time, then the fault identification component identifies the step and the event as the previously unidentified fault. In another example, the fault identification component determines if any event is in a failed state. If an event is in a failed state, the fault identification component identifies the event as the previously unidentified fault. In some embodiments, the fault identification component identifies more than one fault as the previously unidentified fault.

According to some aspects, the graphical user interface displays the identified fault. In a case where the identified fault is an event that is in a failed state, the graphical user interface displays the identified fault as a visual element that indicates a failed event (such as displaying the event with a visually distinguishing characteristic such as a colored border or other design element that is unique to events that have a failed status). In a case where the identified fault is an event that includes a step that is in or was in a processing state for longer than a predetermined amount of time, the graphical user interface displays the identified fault as a visual element that indicates a hanged event (such as displaying the event with a visually distinguishing characteristic such as a colored border or other design element that is unique to events that include a hanged processing step).

Figure 6:
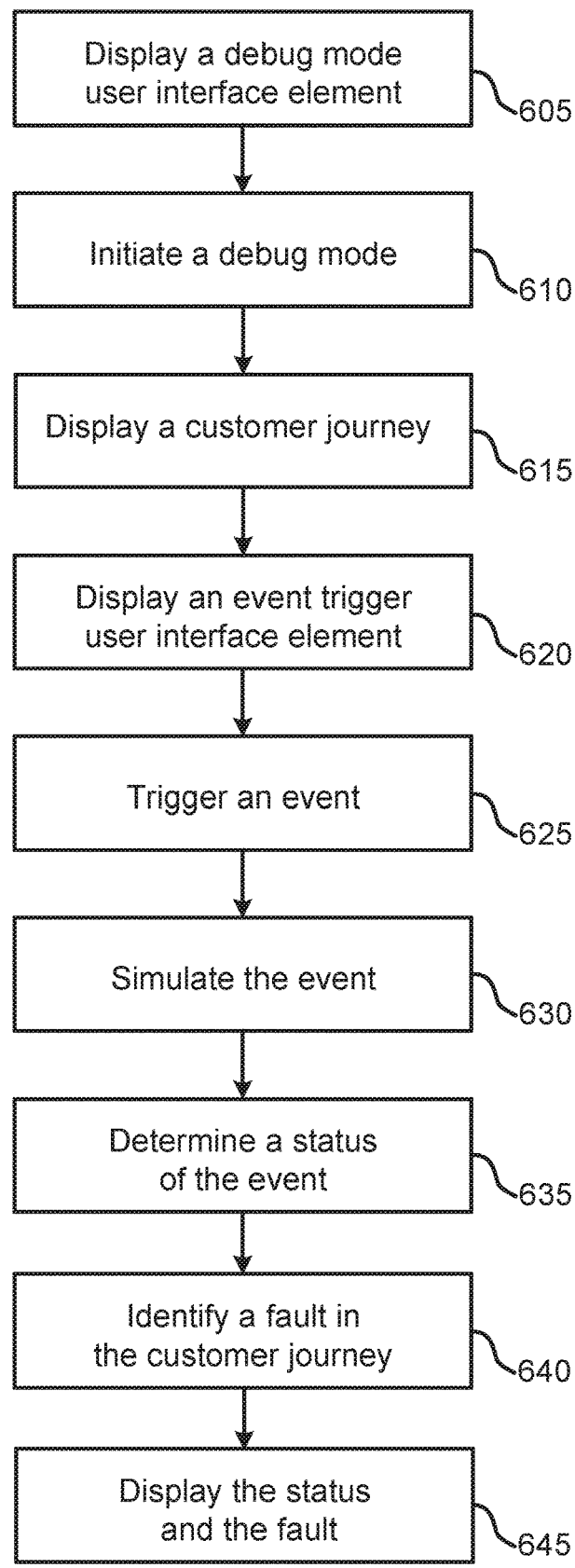
FIG. 6 shows an example of a customer journey debugging process using a customer journey orchestration application according to aspects of the present disclosure.

FIG. 6 shows an example of a customer journey debugging process using a customer journey orchestration application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system displays a debug mode user interface element. In some cases, the operations of this step refer to, or may be performed by, a graphical user interface as described with reference to FIGS. 2-3, 7, 9-10, and 12-15. In an example, the graphical user interface displays a debug user interface element as described with reference to FIGS. 5 and 7.

At operation 610, the system initiates a debug mode. In some cases, the operations of this step refer to, or may be performed by, a mode selection component as described with reference to FIG. 2. In an example, the mode selection component initiates the debug mode as described with reference to FIGS. 5 and 7.

At operation 615, the system displays a customer journey. In some cases, the operations of this step refer to, or may be performed by, a graphical user interface as described with reference to FIGS. 2-3, 7, 9-10, and 12-15. In an example, the graphical user interface displays the customer journey as described with reference to FIGS. 5 and 7.

At operation 620, the system displays an event trigger user interface element. In some cases, the operations of this step refer to, or may be performed by, a graphical user interface as described with reference to FIGS. 2-3, 7, 9-10, and 12-15. In an example, the graphical user interface displays the event trigger user interface element as described with reference to FIGS. 5 and 7.

At operation 625, the system triggers an event. In some cases, the operations of this step refer to, or may be performed by, an event simulation component as described with reference to FIGS. 2 and 3 via a graphical user interface as described with reference to FIGS. 2-3, 7, 9-10, and 12-15. In an example, the event simulation component triggers the event via the graphical user interface as described with reference to FIGS. 5 and 8.

At operation 630, the system simulates the event. In some cases, the operations of this step refer to, or may be performed by, an event simulation component as described with reference to FIGS. 2 and 3. In an example, the event simulation component simulates the event as described with reference to FIG. 5.

At operation 635, the system determines a status of the event. In some cases, the operations of this step refer to, or may be performed by, a status component as described with reference to FIGS. 2 and 3. In an example, the status component determines the status of the event as described with reference to FIG. 5.

At operation 640, the system identifies a fault in the customer journey. In some cases, the operations of this step refer to, or may be performed by, a fault identification component as described with reference to FIG. 2. In an example, the fault identification component identifies the fault in the customer journey as described with reference to FIG. 5.

At operation 645, the system displays the status and the fault. In some cases, the operations of this step refer to, or may be performed by, a graphical user interface as described with reference to FIGS. 2-3, 7, 9-10, and 12-15. In an example, the graphical user interface displays the status and the fault as described with reference to FIG. 5.

Figure 7:
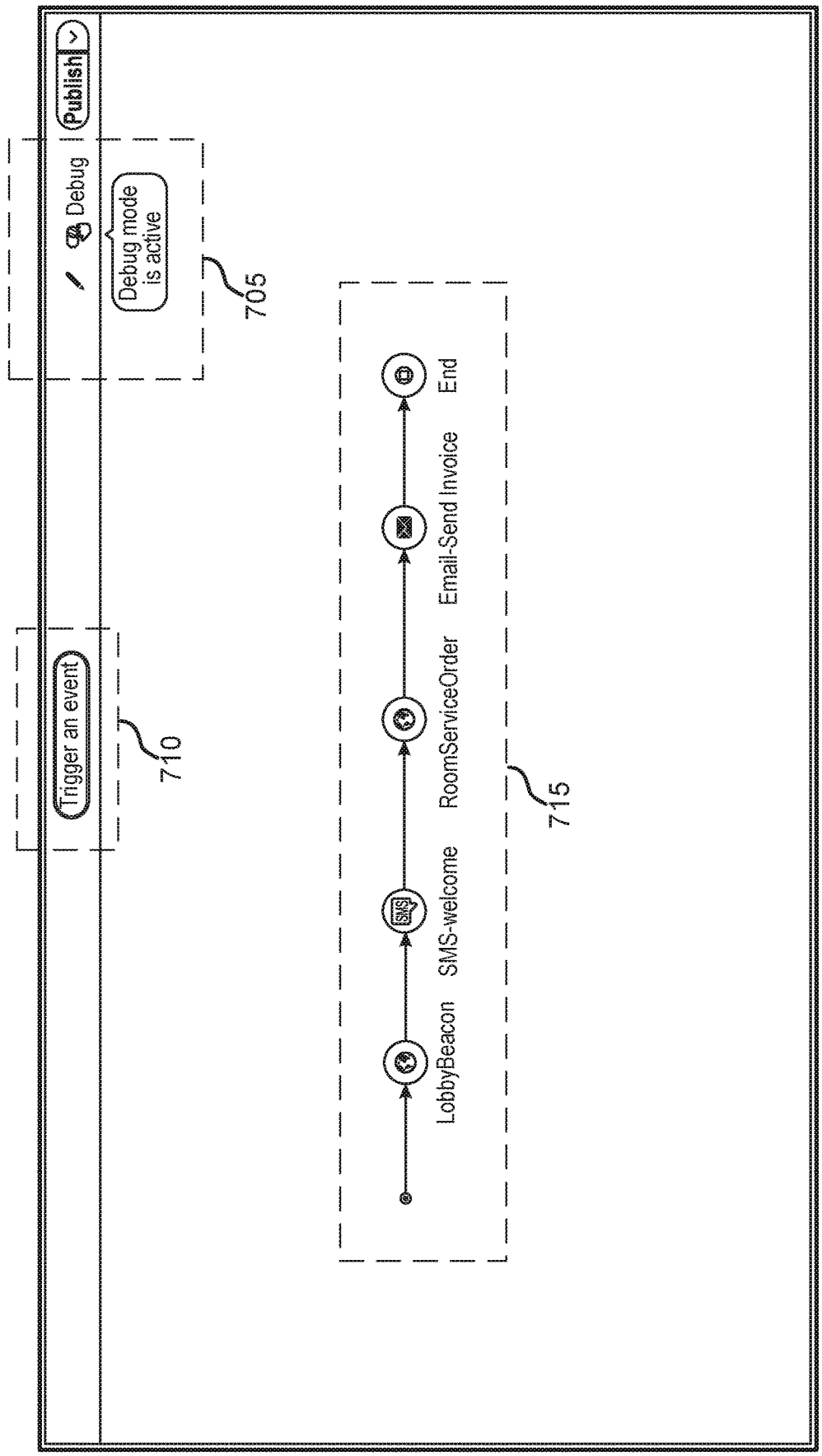
FIG. 7 shows an example of a debug mode selection according to aspects of the present disclosure.

FIG. 7 shows an example of a debug mode selection according to aspects of the present disclosure. Graphical user interface 700 is an example of, or includes aspects of, the corresponding element described with reference to FIGS. 2-3, 6, 9-10, and 12-15. In one aspect, graphical user interface 700 includes debug mode user interface element 705, event trigger user interface element 710, and customer journey 715. Event trigger user interface element 710 is an example of, or includes aspects of, the corresponding element described with reference to FIG. 8.

Referring to FIG. 7, in an example, the customer journey orchestration application described with reference to FIGS. 2 and 3 enters a debug mode in response to a debug mode selection (e.g., an input to debug mode user interface element 705). In this case, the debug mode selection is made by interacting with a toggle button labeled "Debug" displayed in graphical user interface 700. In response to receiving the debug mode selection, graphical user interface 700 instructs a mode selection component described with reference to FIG. 2 to initiate a debug mode for the customer journey orchestration application. In response to the debug mode being initiated for the customer journey orchestration application, a pop-up message labeled "Debug mode is activated" is displayed by graphical user interface 700. In an example, customer journey 715 is displayed in response to the initiation of the debug mode. In this case, customer journey 715 includes a first event ("LobbyBeacon") and a second event ("SMS-welcome"), where the first event is an antecedent event and the second event is a subsequent event that initiates upon completion of the first event. Customer journey 715 also includes a third event ("RoomServiceOrder") and a fourth event ("Email-Send Invoice"), where the third event is an antecedent event and the fourth event is a subsequent event that initiates upon completion of the third event. In an example, the order of the displayed events is determined as described with reference to FIG. 8.

Figure 8:
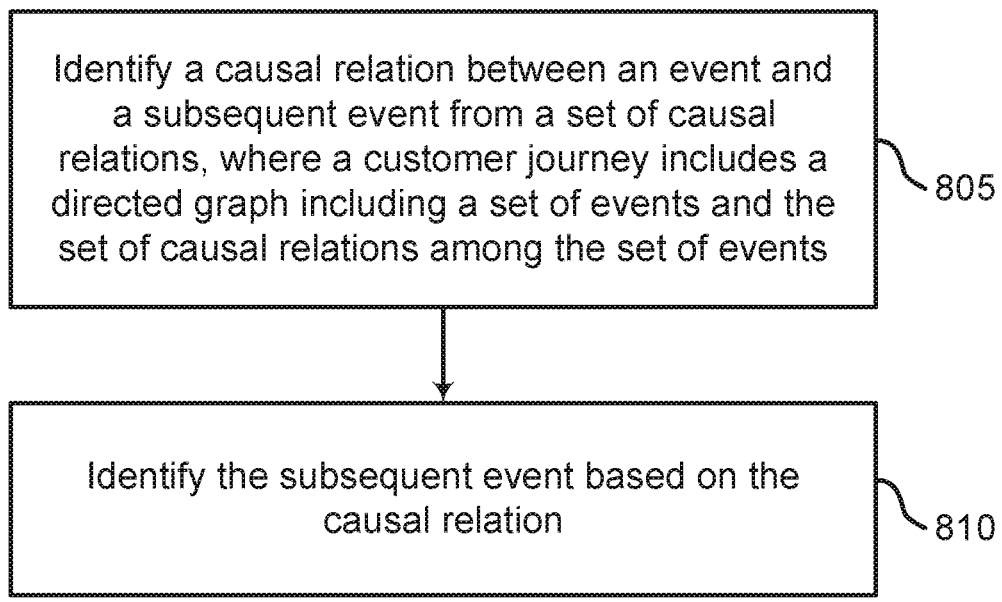
FIG. 8 shows an example of identifying events of a customer journey according to aspects of the present disclosure.

FIG. 8 shows an example of identifying events of a customer journey according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. Referring to FIG. 8, the system identifies causal relations among a set of events that describe a customer journey.

At operation 805, the system identifies a causal relation between an event and a subsequent event or an antecedent event from a set of causal relations, where a customer journey includes a directed graph including a set of events and the set of causal relations among the set of events. In some cases, the operations of this step refer to, or may be performed by, an event simulation component as described with reference to FIGS. 2 and 3.

A directed graph is a set of vertices and a collection of directed edges that each connects an ordered pair of vertices. A directed edge points from the first vertex in the pair and points to the second vertex in the pair. According to some aspects, each event in the set of events is a vertex in the directed graph of the customer journey, and the causal relations among the events are represented in the graph by the directed edges between the events. The event simulation component identifies the causal relationship between the event and the subsequent event or the antecedent event by computing whether a directed edge exists between at least two vertices of the directed graph, such as by various directed graph searching algorithms. According to some aspects, the directed graph of the customer journey is stored in a database such as the database described with reference to FIG. 1.

At operation 810, the system identifies the event based on the causal relation. In some cases, the operations of this step refer to, or may be performed by, an event simulation component as described with reference to FIGS. 2 and 3. For example, where the event simulation component determines that a directed edge exists between two events in the directed graph of the customer journey, the event simulation component computes a direction of the directed edge, thereby determining which of the two events is the antecedent event and which is the subsequent event that depends on the occurrence of the antecedent event. The event simulation component thereby determines an order of events for the ordered series of events of the customer journey, and allows the graphical user interface to determine an order of events to display in response to various user inputs and selections as described with reference to various embodiments of the present disclosure.

Figure 9:
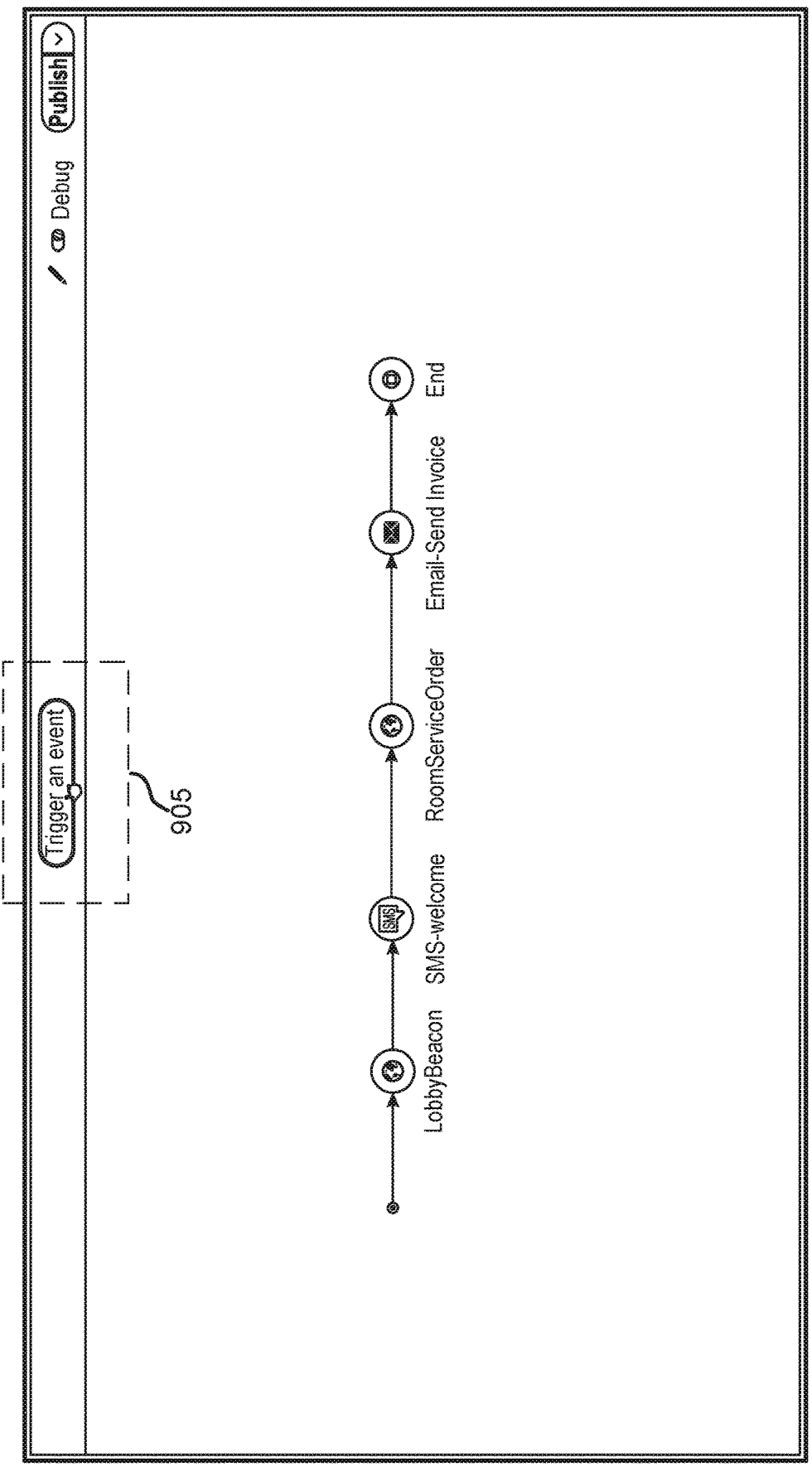
FIG. 9 shows an example of a user input to an event trigger user interface element according to aspects of the present disclosure.

FIG. 9 shows an example of a user input to an event trigger user interface element according to aspects of the present disclosure. Graphical user interface 900 is an example of, or includes aspects of, the corresponding element described with reference to FIGS. 2, 3, 7, 10, and 12-15. In one aspect, graphical user interface 900 includes event trigger user interface element 905. Event trigger user interface element 905 is an example of, or includes aspects of, the corresponding element described with reference to FIG. 7.

Referring to FIG. 9, graphical user interface 900 receives a user input to event trigger user interface element 905 (in this case, an interactive button labeled "Trigger an event"). In an example, the user clicks the "Trigger an event" button, indicating that the "LobbyBeacon" event (e.g., an event in which a customer device associated with the customer profile is physically present in a hotel lobby) is complete. In an example, the user input to event trigger user interface element 905 triggers the "LobbyBeacon" event based on a previous user input to the "LobbyBeacon" visual element, thereby selecting the "LobbyBeacon" event. In another example, the user input to event trigger user interface element 905 returns a prompt displayed by graphical user interface 900 to select an event to trigger by clicking on a visual element for an event. In this case, the customer journey orchestration application has identified that "LobbyBeacon" is an antecedent event for the "SMS-welcome" event (e.g., an event in which an automated SMS welcome message is sent to a customer in response to the completion of the "LobbyBeacon" event), and based on the identification, receives the user input to event trigger user interface element 905 as an indication that the event is complete. In an example, the user can choose to override this interpretation of the user input by the customer journey orchestration application by interacting with an associated element displayed in graphical user interface 900, and can instead choose to simulate the "LobbyBeacon" event.

Figure 10:
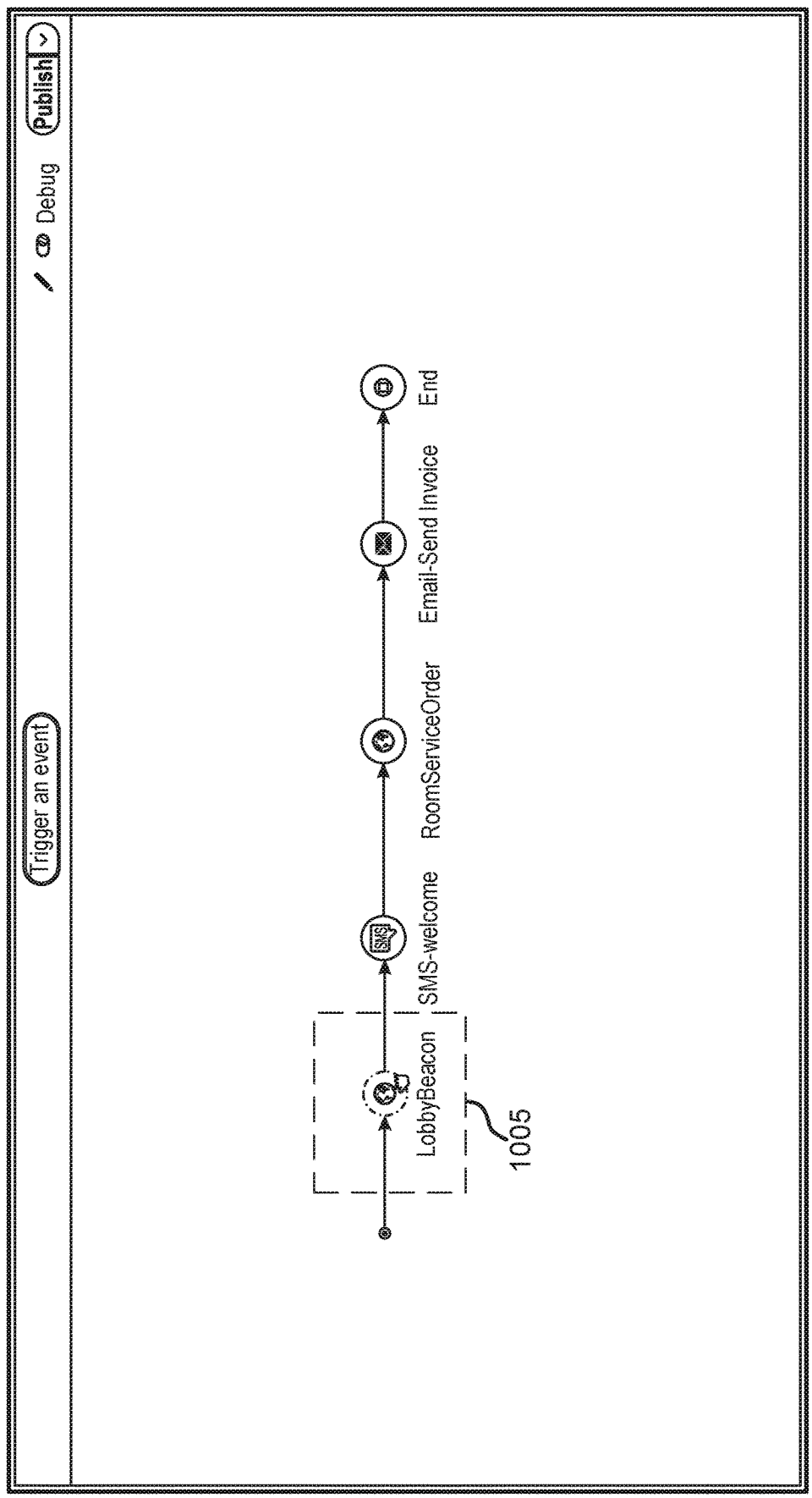
FIG. 10 shows an example of updating status information according to aspects of the present disclosure.

FIG. 10 shows an example of updating status information according to aspects of the present disclosure. Graphical user interface 1000 is an example of, or includes aspects of, the corresponding element described with reference to FIGS. 2, 3, 7, 9, and 12-15. In one aspect, graphical user interface 1000 includes first event visual element 1005.

Referring to FIG. 10, graphical user interface 1000 updates first event visual element 1005 (a visual element associated with the "LobbyBeacon" event) with a mixed-dash line circular border to indicate that first event is in a "processing" state prior to being put into a "complete" state by the customer journey application in response to the user input. Graphical user interface 1000 receives the status of a most recent step of the first event from a status component described with reference to FIG. 2 and updates the first event visual element 1005 in response to the most received status. In this case, the first event is an antecedent event that has been indicated to be complete by a user input as described with reference to FIG. 9, and so the "processing" state of the first event is only briefly displayed before the first event is updated to a "complete" status by the status component. The first event visual element 1005 can be updated in various ways (such as changes to shapes and colors included in the visual element) according to various embodiments.

Figure 11:
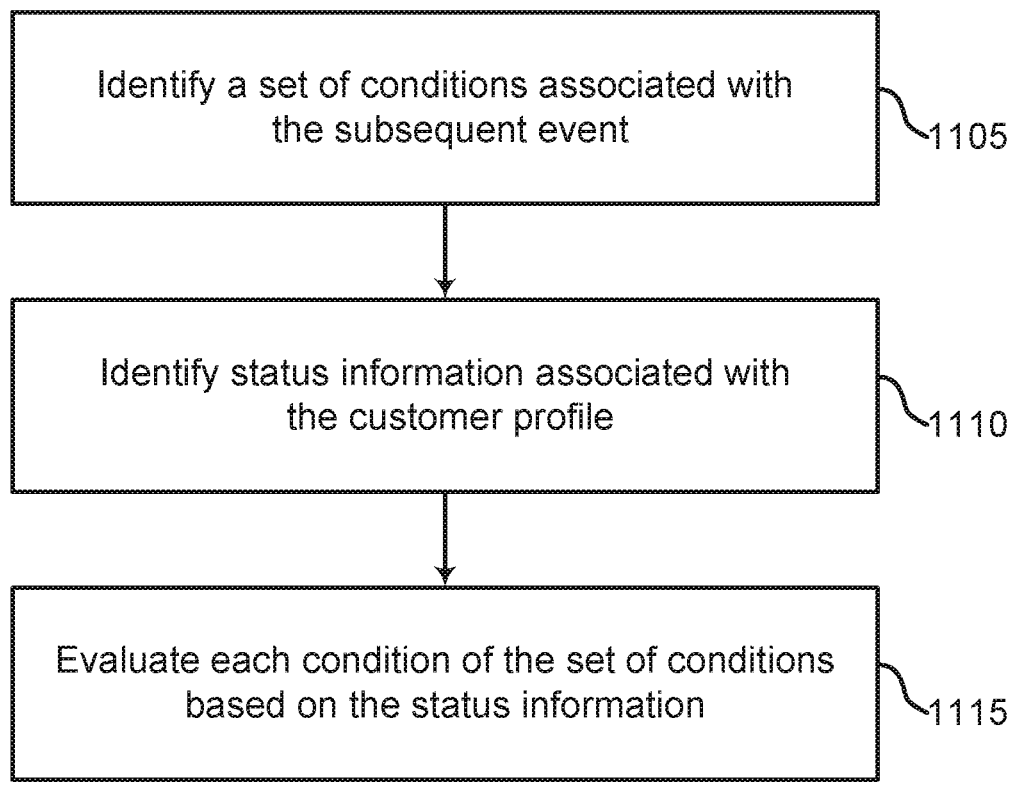
FIG. 11 shows an example of evaluating event conditions according to aspects of the present disclosure.

FIG. 11 shows an example of evaluating event conditions according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 11, the system performs a computation associated with a subsequent event of the plurality of events by identifying a set of conditions associated with the subsequent event, identifying status information associated with the customer profile, and evaluating each condition of the set of conditions based on the status information. In some embodiments, the system simulates an event by performing the computation.

At operation 1105, the system identifies a set of conditions associated with the event. In some cases, the operations of this step refer to, or may be performed by, an event simulation component as described with reference to FIGS. 2 and 3. According to some aspects, the event simulation component identifies a set of conditions associated with the event by retrieving the conditions from a data schema stored in a database, such as the database described with reference to FIG. 1.

In at least one embodiment, the data schema is a rule-based event schema. For example, in a rule-based schema, a set of conditions or data schema rules are associated with an event (such as a relationship between an antecedent event and a subsequent event) so that events are triggered when the event satisfies a set of conditions. Referring to FIGS. 7, 9-10, and 12-15, a rule-based data schema could include a rule such that when a "LobbyBeacon" event satisfies a set of conditions for completion of the event (including a customer device associated with a customer account being physically present in a particular hotel lobby, as determined by geofencing, etc.), a subsequent event of an SMS welcome message is associated with the set of conditions for the "LobbyBeacon" event, as well as additional conditions (such as the customer opting-in to the SMS message event, the hotel associated with the geofence maintaining a current contact telephone number to send the SMS message to, etc.). Another example of an antecedent event and a subsequent event associated with a set of conditions shown by FIGS. 7, 9-10, and 12-15 is the "RoomServiceOrder" antecedent event and the "Email-Send Invoice" subsequent event. According to some aspects, the set of conditions includes an order of steps (e.g., actions) to be performed in simulating an event.

At operation 1110, the system identifies status information associated with the customer profile. In some cases, the operations of this step refer to, or may be performed by, a status component as described with reference to FIGS. 2 and 3. According to some aspects, the status information associated with the customer profile is information that indicates the status of a step associated with processing an event. For example, FIGS. 13-15 illustrate examples of status information associated with the customer profile and steps corresponding to a set of conditions associated with an event, such as an antecedent event or a subsequent event. According to some aspects, the status component receives the status information from the event simulation component in real time as the event simulation component simulates an event, such as by transmitting one or more trace events. According to some aspects, the status information includes a start time and date and an end time and date corresponding to a step associated with processing the event.

At operation 1115, the system evaluates each condition of the set of conditions based on the status information. In some cases, the operations of this step refer to, or may be performed by, an event simulation component as described with reference to FIGS. 2 and 3. According to some aspects, the status component provides the identified status information for the customer profile to the event simulation component, and the event simulation component evaluates each condition of the set of conditions based on the status information by determining status information corresponding to each condition of the set of conditions, and whether antecedent steps for an event have been completed so that subsequent steps for the event and/or a subsequent event may be completed. FIGS. 13-15 illustrate examples in which status information corresponding to conditions in the set of conditions associated with events in the customer journey are displayed by the graphical user interface.

According to some aspects, the status component updates status information of the customer profile corresponding to the event based on the user input. In an example, the user input indicates an event is completed, and the status component updates status information of the customer profile corresponding to the set of conditions associated with the event to "complete".

FIG. 12 shows an example of displaying a status for one or more events of a customer profile according to aspects of the present disclosure. Graphical user interface 1200 is an example of, or includes aspects of, the corresponding element described with reference to FIGS. 2, 3, 7, 9-10, and 13-15. In one aspect, graphical user interface 1200 includes first event visual element 1205 and second event visual element 1210. First event visual element 1205 is an example of, or includes aspects of, the corresponding element described with reference to FIG. 13. Second event visual element 1210 is an example of, or includes aspects of, the corresponding element described with reference to FIGS. 13 and 14.

Referring to FIG. 12, the dashed-line circular border displayed in first event visual element 1205 corresponding to the first event (the "LobbyBeacon" antecedent event) of graphical user interface 1200 show that the "LobbyBeacon" event is completed (e.g., in a "complete" state or status). The mixed dashed-line circular border displayed in second event visual element 1210 corresponding to the second event (the "SMS-welcome" subsequent event) in graphical user interface 1200 show that the "SMS-welcome event" has a status of "in process".

FIG. 13 shows an example of displaying status information for an antecedent event according to aspects of the present disclosure. Graphical user interface 1300 is an example of, or includes aspects of, the corresponding element described with reference to FIGS. 2, 3, 7, 9-10, 12, 14, and 15. In one aspect, graphical user interface 1300 includes first event visual element 1305, second event visual element 1310, and first event status information 1315. First event visual element 1305 is an example of, or includes aspects of, the corresponding element described with reference to FIG. 12. Second event visual element 1310 is an example of, or includes aspects of, the corresponding element described with reference to FIGS. 12 and 14.

Referring to FIG. 13, a user interaction with first event visual element 1305 corresponding to a completed first event (the "LobbyBeacon" antecedent event) displayed via graphical user interface 1300 prompts graphical user interface 1300 to display first event status information 1315 associated with the "LobbyBeacon" event and corresponding to steps of the event (e.g., previous states of the event corresponding to an ordered series of processing steps), as well as a most recent status of the event ("user_engagement event qualified for journey"). Graphical user interface 1300 displays a timeline of the statuses of the event as they update. In this example, graphical user interface 1300 displays a visual key for identifying visual elements corresponding to the event statuses. In an example, the "LobbyBeacon" event is an antecedent event that is indicated as being complete by a user input, and graphical user interface 1300 displays "complete" event statuses corresponding to each set of a set of conditions associated with the event.

FIG. 14 shows an example of displaying status information of a subsequent event according to aspects of the present disclosure. Graphical user interface 1400 is an example of, or includes aspects of, the corresponding element described with reference to FIGS. 2, 3, 7, 9-10, 12, 13, and 15. In one aspect, graphical user interface 1400 includes second event visual element 1405 and second event status information 1410. Second event visual element 1405 is an example of, or includes aspects of, the corresponding element described with reference to FIGS. 12 and 13.

Referring to FIG. 14, a user interaction with second event visual element 1405 corresponding to a completed second event (the "SMS-welcome" subsequent event that is triggered in response to the "LobbyBeacon" antecedent event entering a completed status) displayed via graphical user interface 1400 prompts graphical user interface 1400 to display second event status information 1410 associated with the "SMS-welcome" event and corresponding to steps of the event (e.g., previous states of the event corresponding to an ordered series of processing steps), as well as a most recent status of the event ("Message sent"). In this case, graphical user interface 1400 displays a dashed-line border in second event visual element 1405 to indicate that the second event is in a completed state. Graphical user interface 1400 displays a timeline of status information corresponding to conditions in a set of conditions associated with the SMS-welcome event, in which the SMS-welcome moves from a "SMS action trigger initiated" event initiation state to intermediary states to a final "Message sent" complete state. In this case, the second event is an example of a simulated customer touchpoint.

FIG. 15 shows an example of displaying status information of a failed event according to aspects of the present disclosure. Graphical user interface 1500 is an example of, or includes aspects of, the corresponding element described with reference to FIGS. 2, 3, 7, 9-10, and 12-14. In one aspect, graphical user interface 1500 includes third event visual element 1505, fourth event visual element 1510, and fourth event status information 1515.

Referring to FIG. 15, a user interaction with fourth event visual element 1510 corresponding to a failed fourth event (the "Email-Send Invoice" subsequent event that is triggered in response to the "RoomServiceOrder" antecedent third event entering a completed status) displayed via graphical user interface 1500 prompts graphical user interface 1500 to display fourth event status information 1515 associated with the "Email-Send Invoice" event and corresponding to steps of the event (e.g., previous states of the event corresponding to an ordered series of processing steps), as well as a most recent status of the event ("Message fail: Profile is in exclusion list"). In this case, the completion of the "RoomServiceOrder" subsequent event is indicated by the mixed-dash border included in third event visual element 1505.

In this case, the "Email-Send Invoice" subsequent event failed to complete because the simulated event associated with the subsequent event failed to satisfy a condition that the customer profile includes an email address that accepts email communications. Here, the email address associated with the customer profile is in an exclusion list, and graphical user interface 1500 displays this information to the user. In at least one embodiment, a fault identification component identifies the "Email-Send Invoice" event as a previously unidentified fault of the customer journey based on the "Message fail" status, and displays the fault to the user via the closely-dashed line included in fourth event visual element 1510. In this manner, a user of the customer journey orchestration application is quickly provided with helpful debugging information for the customer journey, and could resolve the failed "Email-Send Invoice" event by removing the event from the customer journey, by changing the event to an alternate customer touchpoint such as an SMS message, etc., or by performing other appropriate responses.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for customer journey orchestration, comprising:
    identifying, by a customer journey orchestration application, a customer journey having a previously unidentified fault;
    initiating, by a mode selection component, a debug mode of the customer journey orchestration application for the customer journey;
    receiving, by a graphical user interface of the customer journey orchestration application, a user input corresponding to an event of a plurality of events of the customer journey;
    simulating, by an event simulation component, the event based on the user input and the debug mode;
    determining, by a status component, a status of the event based on the simulation;
    identifying, by a fault identification component, the previously unidentified fault based on the status of the event; and
    displaying, using the graphical user interface, an indication of the previously unidentified fault.

2. The method of claim 1, further comprising:
    receiving, by a mode selection component, a debug mode selection, wherein the debug mode is initiated in response to the debug mode selection; and
    displaying, in the graphical user interface of the customer journey orchestration application, an event trigger user interface element for triggering the event based on the debug mode.

3. The method of claim 1, further comprising:
    updating, by the status component, status information of a customer profile corresponding to the event based on the user input.

4. The method of claim 1, wherein:
    the customer journey comprises a directed graph including the plurality of events and a plurality of causal relations among the plurality of events.

5. The method of claim 4, further comprising:
    identifying, by the event simulation component, a causal relation between the event and an antecedent event from the plurality of causal relations; and
    identifying, by the event simulation component, the event based on the causal relation.

6. The method of claim 1, further comprising:
    transmitting, by the event simulation component, a trace event corresponding to each processing step of the simulation, wherein the status of the event is based on the trace event.

7. The method of claim 1, further comprising:
    identifying, by the event simulation component, a set of conditions associated with the event;
    identifying, by the status component, status information associated with a customer profile; and
    evaluating, by the event simulation component, each condition of the set of conditions based on the status information.

8. The method of claim 1, further comprising:
    updating, by the status component, a color of the event in the graphical user interface for the customer journey based on the status of the event.

9. The method of claim 1, further comprising:
simulating, by the event simulation component, a customer touchpoint to a customer; and
detecting, by the status component, a status of the simulated customer touchpoint, wherein a status of a subsequent event includes the status of the simulated customer touchpoint.

10. The method of claim 1, further comprising:
simulating, by the event simulation component, an interaction with a website on a web browser; and
detecting, by the status component, a status of the website based on the simulated interaction with the website, wherein the status of the website includes a status of the simulated interaction.

11. The method of claim 1, further comprising:
tagging, by the event simulation component, the event with a session code, wherein the session code identifies the event as being included in the customer journey.

12. A method for customer journey orchestration, comprising:
initiating, by a mode selection component, a debug mode;
receiving, by a graphical user interface, a user input corresponding to an event of a plurality of events in a customer journey, wherein the user input indicates that the event has been completed for a customer profile;
identifying, by an event simulation component, a set of conditions associated with a subsequent event of the plurality of events based on the debug mode;
identifying, by a status component, status information associated with the customer profile;
evaluating, by the event simulation component, each condition of the set of conditions based on the status information;
determining, by the status component, a status of the subsequent event for the customer profile based on the evaluation; and
displaying the status of the subsequent event for the customer profile in the graphical user interface.

13. The method of claim 12, further comprising:
receiving, by the mode selection component, a debug mode selection; and
initiating, by the mode selection component, the debug mode in response to the debug mode selection, wherein an event trigger user interface element is displayed based on the debug mode.

14. The method of claim 12, further comprising:
updating, by the status component, status information of the customer profile corresponding to the event based on the user input.

15. The method of claim 12, further comprising:
identifying, by the event simulation component, a causal relation between the event and the subsequent event from a plurality of causal relations; and
identifying, by the event simulation component, the subsequent event based on the causal relation.

16. The method of claim 12, further comprising:
determining, by the status component, that a condition from the set of conditions is not satisfied, wherein the status of the subsequent event includes an indication that the condition is not satisfied.

17. The method of claim 12, further comprising:
determining, by the status component that each condition from the set of conditions is satisfied, wherein the status of the subsequent event includes an indication that the subsequent event is complete.

18. An apparatus for customer journey orchestration, comprising:
a customer journey orchestration application configured to identify a customer journey having a previously unidentified fault;
a mode selection component configured to initiate a debug mode of the customer journey orchestration application for the customer journey;
a graphical user interface configured to receive a user input corresponding to an event of a plurality of events of the customer journey;
an event simulation component configured to simulate the event based on the user input and the debug mode;
a status component configured to determine a status of the event based on the simulation; and
a fault identification component configured to identify the previously unidentified fault based on the status of the event.

19. The apparatus of claim 18, wherein:
the mode selection component is further configured to receive a debug mode selection, wherein the debug mode is initiated in response to the debug mode selection; and
the graphical user interface is further configured to display an event trigger user interface element for triggering the event based on the debug mode.

20. The apparatus of claim 18, wherein:
the apparatus comprises a personal computation device including a software application, wherein the graphical user interface, the event simulation component, the status component, and the fault identification component are included in the software application.

* * * * *